United States Patent
Piccionelli et al.

(10) Patent No.: US 12,222,757 B2
(45) Date of Patent: Feb. 11, 2025

(54) FLEXIBLE DISPLAY SCREEN SYSTEMS AND METHODS

(71) Applicants: Gregory A. Piccionelli, Westlake Village, CA (US); Ted R. Rittmaster, Westlake Village, CA (US)

(72) Inventors: Gregory A. Piccionelli, Westlake Village, CA (US); Ted R. Rittmaster, Westlake Village, CA (US)

( * ) Notice: Subject to any disclaimer, the term of this patent is extended or adjusted under 35 U.S.C. 154(b) by 64 days.

(21) Appl. No.: 17/590,574

(22) Filed: Feb. 1, 2022

(65) Prior Publication Data

US 2022/0155818 A1 May 19, 2022

Related U.S. Application Data

(63) Continuation of application No. 16/920,525, filed on Jul. 3, 2020, now Pat. No. 11,262,799, which is a continuation of application No. 14/818,970, filed on Aug. 5, 2015, now Pat. No. 10,739,817.

(60) Provisional application No. 62/033,822, filed on Aug. 6, 2014.

(51) Int. Cl.
*G06F 1/16* (2006.01)
*G02F 1/1333* (2006.01)
*G06F 3/01* (2006.01)
*G09F 9/30* (2006.01)
*G09F 21/02* (2006.01)
*G09F 21/04* (2006.01)
*G09F 27/00* (2006.01)

(52) U.S. Cl.
CPC ........ *G06F 1/163* (2013.01); *G02F 1/133305* (2013.01); *G06F 1/1652* (2013.01); *G06F 3/011* (2013.01); *G09F 9/301* (2013.01); *G09F 21/02* (2013.01); *G09F 21/048* (2013.01); *G09F 27/005* (2013.01); *G09F 21/023* (2020.05)

(58) Field of Classification Search
CPC ........ G06F 1/163; G06F 1/1652; G06F 3/011; G02F 1/133305; G09F 9/301; G09F 21/02; G09F 21/048; G09F 27/005; G09F 21/023
See application file for complete search history.

(56) References Cited

U.S. PATENT DOCUMENTS

| | | | | |
|---|---|---|---|---|
| 2010/0117975 A1* | 5/2010 | Cho | ...... | G06F 3/0202 345/173 |
| 2014/0004906 A1* | 1/2014 | Chi | ...... | G06F 1/1635 455/566 |
| 2016/0026219 A1* | 1/2016 | Kim | ...... | G06F 1/1641 345/173 |

* cited by examiner

*Primary Examiner* — Jonathan A Boyd
(74) *Attorney, Agent, or Firm* — Gregory B. Gulliver

(57) ABSTRACT

A flexible display screen system and method includes an article that has a flexible material configured to cover at least a portion of a person's anatomy or at least a portion of an object. At least one flexible display screen is secured on the flexible material. A computer system is configured to provide image information for controlling a display of images on the flexible display screen. The computer system is configured to control the display of images on the flexible display screen in response to the sensor signal. The sensor may sense flexing of the flexible display screen or flexible material. Alternatively or in addition, the flexible display screen or flexible material may be controlled to flex, in response to the images displayed on the flexible display screen.

16 Claims, 5 Drawing Sheets

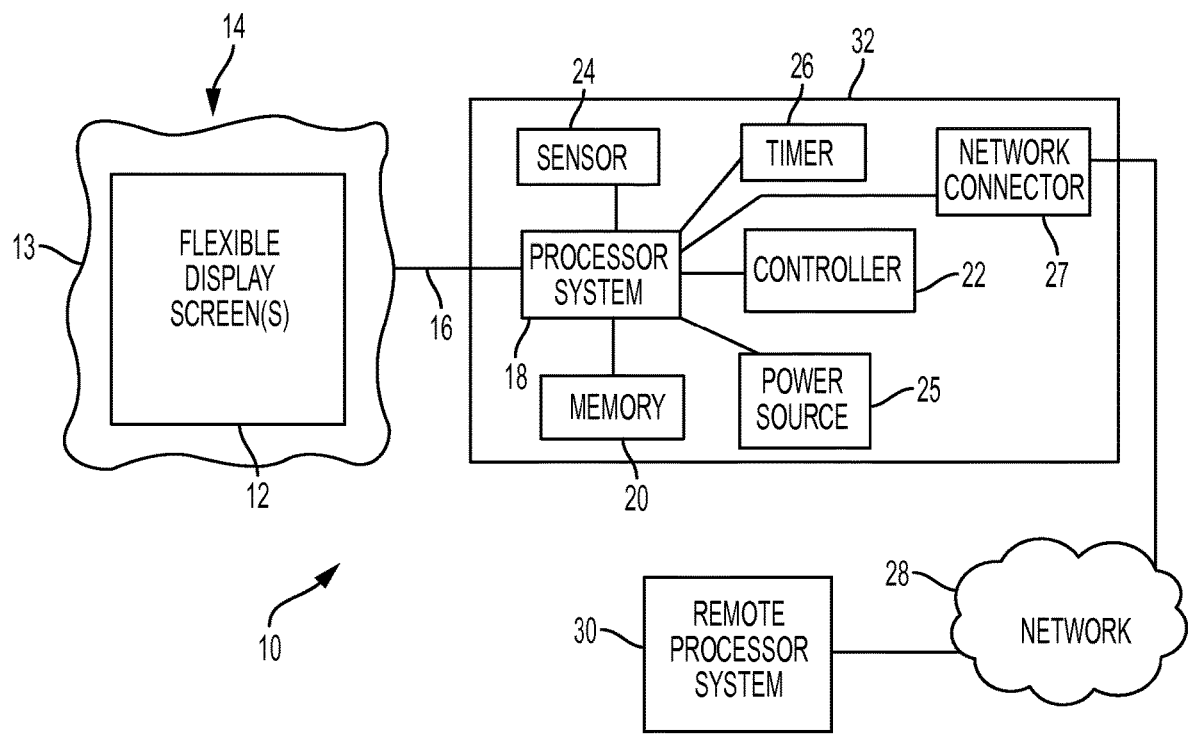
FIG. 1
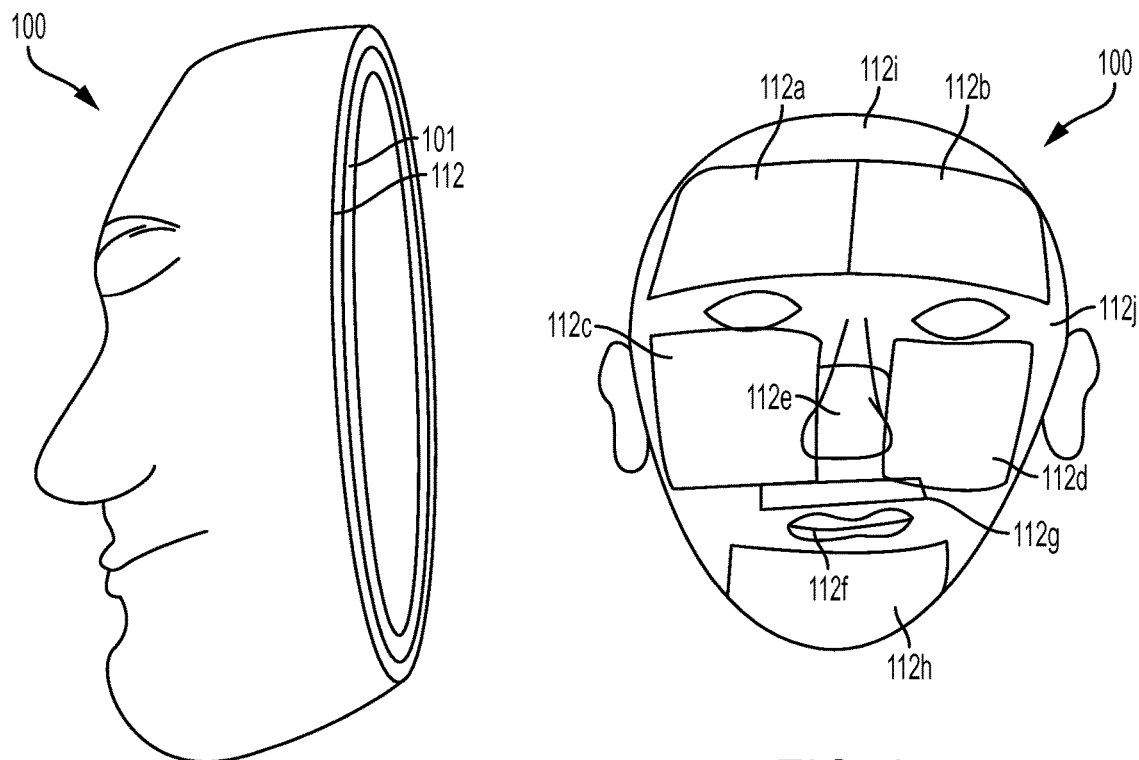
FIG. 2
FIG. 3

FLEXIBLE DISPLAY SCREEN SYSTEMS AND METHODS

CROSS REFERENCE TO RELATED APPLICATION

This application is a continuation of and claims priority of U.S. patent application Ser. No. 16/920,525, filed on Jul. 3, 2020, which is a continuation of U.S. patent application Ser. No. 14/818,970, filed on Aug. 5, 2015, which claims the benefit of U.S. Provisional Patent Application No. 62/033,822, filed Aug. 6, 2014, which are all incorporated herein by reference in their entirety.

FIELD OF THE INVENTION

The present disclosure relates to flexible display screen systems and methods and, in particular embodiments, to systems and methods in which one or more flexible display screens is formed as or included in a wearable article or cover for an article.

SUMMARY

A flexible display screen system and method according to embodiments described herein includes an article that has a flexible material configured to cover at least a portion of a person's anatomy or at least a portion of an object. At least one flexible display screen is secured on the flexible material. A computer system is configured to provide image information for controlling a display of images on the flexible display screen. The computer system is configured to control the display of images on the flexible display screen in response to the sensor signal. The sensor may sense flexing of the flexible display screen or flexible material. Alternatively or in addition, the flexible display screen or flexible material may be controlled to flex, in response to the images displayed on the flexible display screen.

BRIEF DESCRIPTION OF DRAWINGS

FIG. 1 is a generalized electrical schematic diagram of a flexible display screen system according to an embodiment of the present invention.

FIG. 2 is a side-perspective view of a flexible display screen mask according to an embodiment of the present invention.

FIG. 3 is a schematic diagram of the mask of FIG. 2.

DETAILED DESCRIPTION

Figure 4:
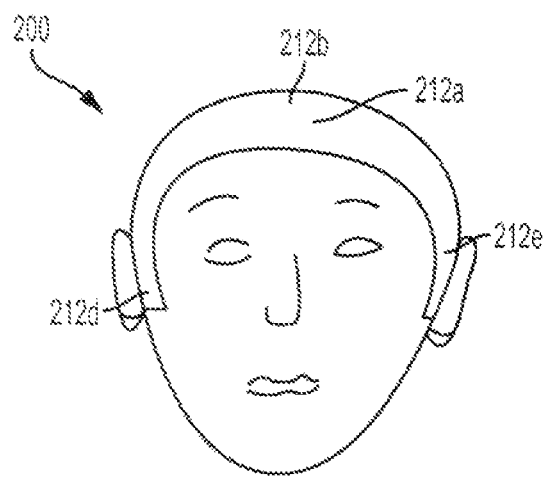
FIG. 4 is a front view of a flexible display screen mask according to another embodiment of the present invention.

The following detailed description is of the best presently contemplated mode of carrying out the invention. This description is not to be taken in a limiting sense, but is made merely for the purpose of illustrating the general principles of the invention. The scope of the invention is best defined by the appended claims.

A general representation of a flexible display screen system 10 is shown in FIG. 1. In system 10, at least one flexible display screen 12 is formed as or included in a flexible article 14. Accordingly, in particular embodiments, the flexible display screen 12 shown in FIG. 1 represents a single flexible display screen, while in other embodiments, the display screen 12 shown in FIG. 1 represents a plurality of individual display screens. The article 14 comprises at least one flexible material, such as, but not limited to a flexible sheet material 11. The article 14 may be, for example, but not limited to, a wearable article (to be worn on a user), a cover for an object (to be placed over and cover at least a portion of an object), an external part or entirety of an object, or other flexible article as described herein.

The flexible display screen(s) 12 is connected, via a suitable connection link 16, to a processor system 18. The processor system 18 includes one or more electronic processors connected to one or more electronic memory devices 20 that store software and data for controlling operations of the processor system 18, as described herein. In particular embodiments, the flexible display screen system 10 also includes one or more manual operators 22 (such as, but not limited to, knobs, buttons, sliders, switches, touch screen icons, voice recognition input devices or the like) for allowing manual input of information by a user. In such embodiments, the processor system 18 is configured to respond to and use the information input by the user in various manners as described herein.

The system 10 also includes one or more power sources 24, for providing electrical power to the processor system 18, memory device(s) 20 and other components described herein. A further power source (not shown) may be provided for powering the flexible display screen(s) 12 (e.g., by a separate power connection to the flexible display screen(s) 12) or, alternatively, the one or more power sources 24 may provide power to the flexible display screen(s) 12 through the link 16. The power sources may include any suitable source of electrical power including, but not limited to, one or more batteries, connections to an AC outlet or other AC source, solar power generating cells, power over Ethernet (PoE), inductive power, or other network power or data/power connection, or the like.

In particular embodiments, the flexible display screen system 10 includes one or more sensors 24 and/or timers 26 that are included in or connected to the processor system 18. In further particular embodiments, the system 10 includes suitable electronics and/or software 27 (associated with or otherwise connected with the processor system 18) for communication connection over a network 28, such as, but not limited to the Internet or other wide area network, a local area network, or the like. In such embodiments, the system 10 may communicate with one or more remote processors 30, over the network 28, as described herein.

The one or more flexible display screen(s) 12 are any suitable flexible electronic display devices, such as, but not limited to, an electronic paper based display, a thin film transistor (TFT) based display, an OLED display or the like. In many of the embodiments described herein, the one or more flexible display screen(s) (12) can be "touch screens" that utilize touch screen technology known in the art to provide users with means of interacting tactilely with icons, buttons and other images displayed on the flexible display screen (12) to enter information into a computer, processor, etc., execute control functions, etc. In particular embodiments, the flexible display screen(s) 12 is formed into an article as described herein (e.g., by being formed into the shape of a portion or all of the article 14). In further embodiments, the flexible display screen(s) 12 is incorporated into the article 14 as described herein (e.g., by being embedded, glued, welded, soldered, sewn or otherwise adhered or attached to a portion of the article 14, such as, to a flexible sheet material 11 or other flexible material).

In an example embodiment, the processor system 18 comprises one or more electronic processor devices, such as, but not limited to, one or more special or general purpose electronic processors configured to perform operations as described herein. In particular embodiments, the processor system 18 is controlled by software or a combination of software and hardware to perform functions as described herein, where the software is stored on any suitable nontransitory storage medium accessible by or associated with the processor system 18, such as, but not limited to the electronic memory device(s) 20.

The one or more electronic memory devices 20 comprise any suitable nontransitory electronic storage device such as, but not limited to, a random access memory RAM, read only memory ROM, solid state memory, floppy disc, hard disc, optical disc, CD, DVD, or the like. In particular embodiments, the processor 18 and electronic memory devices 20 are included in a computer system 32, such as, but not limited to a desk top computer, lap top computer, electronic pad computer (such as, but not limited to an iPad, or the like), a smart phone device (such as, but not limited to an iPhone, android phone, or the like), a wearable computer device (such as Google Glass, a smart watch or smart jewelry) or a computer device prosthetically disposed on or in a person. In particular embodiments, the processor 18 and electronic memory devices 20 are included in other objects that can be associated with one or more flexible displays screens, such as clothing, skin, other living tissue, tree trunks, formerly living tissue, walls, floors, ceilings, doors, windows, mirrors, wall switches, door locks, pipes, street surfaces, runways, light standards, telephone poles, power poles, vehicles (such as cars, trucks, boats and planes), furniture (such as tables), appliances (such as refrigerators, ovens and blenders), beverage and other food containers, ornamental containers, sheets, towels, blankets, puzzle pieces, playing cards, game pieces, toys (such as dolls, stuffed animals, toy construction kit construction pieces, building blocks, including without limitation, interlocking building blocks such as LEGO® pieces, and models), balls (such as soccer balls and golf balls), holiday ornaments, globes, billboards, menus, and books.

The link 16 connecting the flexible display screen(s) 12 with the processor system 18 of the computer system 32 may be any suitable electronic communication link, for communicating data or, in some embodiments, data and power, to the flexible display screen(s) 12. In some embodiments the power source comprises one or more solar cells and a power storage means (such as one or more rechargeable batteries) disposed on or within the flexible display. In embodiments in which the flexible display screen(s) 12 has a separate power source, the link 16 may be a wireless link for communicating data to or from the flexible display screen(s) 12. In other embodiments, the link 16 comprises a wired link that communicates data signals only or, in yet other embodiments, a wired link that communicates both data and power signals. In example embodiments, the link 16 comprises, but is not limited to, one or more of a hard wired, radio frequency (RF), optical, electromagnetic, Ethernet, Blue Tooth, or similar connection. The display screen(s) 12 and the processor 18 (or other components of the computer system 32) include suitable electronics configured (by hardware, software, firmware or combinations thereof) to provide communication operations corresponding to the type of communication link 16 being employed for communication of data (or data and power) as described herein.

The network 28 may be one or more wide area networks (such as, but not limited to the Internet), local area networks or combinations thereof. The remote processor 30 may be any suitable system or object that includes an electronic processor connected for communication over the network 28, including, but not limited to a desk top computer, main frame computer, lap top computer, pad computer, smart phone or the like. In some embodiments the remote processor 30 is included in, associated with, or is a part of, one or more other objects, such as clothing, skin, other living tissue, tree trunks or other formerly living tissue, walls, floors, ceilings, doors, windows, mirrors, wall switches, door locks, pipes, street surfaces, runways, light standards, telephone poles, power poles, vehicles (such as cars, trucks, boats and planes), furniture (such as tables), appliances (such as refrigerators, ovens and blenders), beverage and other food containers, ornamental containers, sheets, towels, blankets, puzzle pieces, playing cards, game pieces, toys (such as dolls, stuffed animals, toy construction kit construction pieces, building blocks, including without limitation, interlocking building blocks such as LEGO® pieces, and models), balls (such as soccer balls and golf balls), holiday ornaments, globes, billboards, menus, and books.

According to embodiments of the present invention, the article 14 is a flexible article or an article that has one or more flexible portions such as, but not limited to, one or more flexible sheet materials 11. In particular embodiments, the article 14 is a wearable article (apparel or accessory) to be worn by a user.

In further embodiments, the article 14 is a cover configured to be placed over and cover at least a portion of an object such as such as clothing, skin, other living tissue (such as plant leaves), tree trunks or other formerly living tissue, walls, floors, ceilings, doors, windows, mirrors, wall switches, door locks, pipes, street surfaces, runways, light standards, telephone poles, power poles, vehicles (such as cars, trucks, boats and planes), furniture (such as tables), appliances (such as refrigerators, ovens and blenders), beverage and other food containers, ornamental containers, sheets, towels, blankets, puzzle pieces, playing cards, game pieces, toys (such as dolls, stuffed animals, toy construction kit construction pieces, building blocks, including without limitation, interlocking building blocks such as LEGO® pieces, and models), balls (such as soccer balls and golf balls), holiday ornaments, globes, billboards, menus, and books.

As shown in FIGS. 2 and 3, the article 14 is a mask 100 configured to fit over the face and/or head of a user. The mask 100 of FIGS. 2 and 3 may be a flexible mask configured to conform to and/or flex and move in correspondence with flexing and movement of a user's face and head, when worn.

In some embodiments the mask 100 is configured with one or more additional display units located in the inside (user facing portion) of the "eye" area(s) of the mask 100 (i.e., covering over part of or all of one or both eyes of a user wearing the mask 100). In some embodiments the additional display unit(s) comprises a heads-up display on which can be displayed information generated from one or more computer systems, including, without limitation, remote computer systems in communication with the additional display unit(s) over the Internet by wireless or wired means.

In some embodiments one or more cameras are affixed to or incorporated into a part of the outward facing portion of the one or more additional display units located in the "eye" area(s) of the mask 100 (i.e., covering over part of or all of one or both eyes of a user wearing the mask 100) or some other forward facing part of the mask. The camera(s) allow(s) for the capturing and transmission to the aforementioned additional display units to enable the wearer to be provided with view of the wearer's surroundings. In some embodiments the information transmitted by the camera(s) can be mixed with other content visible via the aforementioned additional display units to provide an augmented reality experience to the user. An example of use of a system configured as described above in an instance where the wearer is playing an augmented reality game with others using a similarly configured system would be able to present himself or herself as a character, for example, displayed on his or her flexible mask display unit while playing the augmented reality game.

In some embodiments the mask 100 also includes one or more microphones and/or one or more sound generating devices. In some embodiments the microphones are used to capture voice commands that the computer system uses to change the display on the mask display and/or otherwise provide commands to the computer system in communication with the additional display unit(s) (i.e., the eye socket display unit(s)). The sound generation means can be disposed on the outside of the mask, and/or on the inside near the wearer's ears like headphones. In some embodiments, headphone buds are provided on the wearer's side of the mask. These buds can also be used as a means as part of the means of securing or stabilizing the mask on the face of the wearer.

In FIGS. 2 and 3, the mask 100 includes one or more layer(s) 101 of flexible material, such as, but not limited to silicone or latex material, and a second layer 112 composed of one or more flexible display screens (corresponding to the flexible display screen(s) 12 of FIG. 1). In particular embodiments, the layer 112 extends over all or substantially all of the layer(s) 101 of flexible silicone or latex material. In other embodiments, the layer 112 extends over one or more portions of, but not all of the layer 101 of flexible silicone or latex material.

For example, in particular embodiments, the layer 112 comprises one or more of the following regions of the mask 100: a region over the left eye (in the area of an eyebrow), a region over the right eye (in the area of an eyebrow), a region under the left eye (in the area of the left cheek), a region under the right eye (in the area of the right cheek, a region on the nose, a region around the mouth (in the area of the lips), a region over the mouth and below the nose (in a moustache region), a region below the mouth (on or above the chin), a region on the forehead, or the like. In particular embodiments, the layer 112 comprises a plurality of flexible display screens, such as display screens 112(a)-(i), arranged in a respective corresponding plurality of regions (such as, but not limited to, the regions listed above). In other embodiments, the plurality of flexible display screens in layer 112 are arranged in some, but not all and/or in other regions of the mask 100, with respect to the regions listed above. In other embodiments, the layer 112 comprises a single flexible display screen that extends over one or more (or all) of the regions as listed above. In particular embodiments, the layer 112 comprises one or more flexible display screens that extend over the entire mask 100. In some embodiments, one or more flexible display screen segments can be custom fabricated to fit the wearer's face. For example a "full face" or full face and head unit can be fabricated to fit the wearer's face and/or head.

For example, a headdress style mask may include the facial part as an integrated part of a pullover mask which includes a part that goes over and around the head. In particular examples of such embodiments, the flexible display screen could include the all or part of the entire outer surface of such a flexible mask (to simulate hair, baldness, provide green screen color, etc.).

In certain embodiments, the flexible display screen(s) is in the layer 112, which is adhered to the layer 101. In particular embodiments, the layer 112 includes a layer of flexible, transparent material, such as, but not limited to a silicone material, in which the one or more flexible displays are embedded. In yet other embodiments, the layer 112, itself, is one or more thin film flexible displays (or a plurality of thin film flexible displays) formed on or otherwise adhered to the layer 102.

In some embodiments of the invention the above configuration including one or more flexible screens is adhered to the surface of, or included into the surface material of sinks, tubs, swimming pools, hot tubs, Jacuzzis™, and shower floors, or along a bottom or lining of toilet bowls and urinals (e.g., to produce an image that can allow kids to urinate down a computer generated mineshaft or put out a computer generated fire, etc.).

In embodiments in which the layer 112 comprises a plurality of flexible displays, the layer 112 may comprise one or more regions 112j in which no flexible display is provided, where such regions 112j may include, but are not limited to, regions of the mask 100 between two or more of the flexible displays or regions of the mask 100 to the side, above or below the flexible displays. In particular embodiments the regions 112j are composed of a thin (e.g., the thickness of the flexible displays, or thinner), transparent (or semi-transparent), flexible material, such as, but not limited to silicone, latex or the like, that connect the plurality of flexible displays together.

Also, in embodiments in which the layer 112 comprises a plurality of flexible displays, the processor 18 may include a corresponding plurality of connection links 16 (in a one-to-one relation to the plurality of flexible display), such that each flexible display has a corresponding, separate connection link 16. In other embodiments, a plurality of flexible displays are connected to the process or 18, through a single connection link 16, such as an addressable data bus or the like, where each flexible display is separately addressable. Accordingly, each of the plurality of flexible displays is separately controlled (relative to the other flexible displays) to display different respective image information, e.g., corresponding to the location of the flexible display on the mask 100. Thus, for example, flexible display 112(a) is controlled to provide an image of a region above a left eye, including a left eyebrow, flexible display 112 (b) is controlled to provide an image of a region above a right eye, including a right eyebrow, and so forth.

Image information for displaying images on the flexible displays in the layer 112 may be stored in the memory 20 and selectively retrieved by the processor 18 for controlling the flexible displays, based on selection input provided by the user, e.g. through the manual controller 22. In other embodiments, some or all of the image information for displaying images is obtained by the processor 18, from one or more remote processors 30, over the network 28.

In particular embodiments, a plurality of selectable images (each different from the other) are stored in the memory 20 (or stored at remote locations on the network 28) and are selectable through the manual controller 22, for one or more (or each) of the plurality of flexible displays in the mask 100. Accordingly, for example, an image from a plurality of images of different eyebrows may be selected by the user for display screens 112(*a*) or 112(*b*), an image from a plurality of images of noses may be selected for the display screen 112(*e*), an image from a plurality of images of different mustaches or upper lips may be selected by the user for the display screen 112(*g*), and so forth. In particular embodiments, two or more of the images for a particular region may show the same image features, but in different colors, shades or tones, to allow selection by the user of different colors, shades or tones for the region. Thus, for example, a color, shade or tone may be selected for images shown on each of the display screens 112(*c*) and 112(*d*), to selectively provide (or not provide) a blushing appearance in the regions of the user's cheeks, or to provide one of a plurality of selectable levels of blushing appearances.

In particular embodiments, the display screen layer 112 (or the display screens in the layer 112) are formed of thin, transparent or semi-transparent materials, so that the layer 101 is visible through the display screen layer 112. In such embodiments, the layer 101 may be colored, shaped and/or otherwise configured to provide a first visual appearance of facial features when the display screen(s) in the layer 112 are off or otherwise not displaying an electronically generated image. In those embodiments, the layer 112 enhances or otherwise changes the visual appearance (to a second visual appearance) of facial features on the mask 100. For example, a first visual appearance may show some or all facial features of layer 101 as appearing without makeup or other enhancements, while a second visual appearance (with one or more display screen(s) in the layer 112 providing an electronically generated image) may show some or all of the same facial features as appearing with makeup or other enhancements. A plurality of selectable images (for example, each having an appearance of a different amount, color, shade, tone, style or other quality of makeup, or other different visible enhancement relative to the other selectable images) may be available and selectable, as described above. Accordingly, in particular embodiments, a user is provided with a plurality of different makeup or other enhancements that can be selected and displayed in the display screen layer 112, to selectively enhance or otherwise change the visual appearance of the facial features on the display screen layer 112. Such other enhancements may include, but are not limited to, images of other visual appearance features may be stored and selected (e.g., other than makeup), such as, but not limited to, features relating to the shape or contour of portions of the face (e.g., nose shapes, lip shapes, cheekbone structures, forehead wrinkles, or the like) and/or images relating to objects on the face (e.g., nose studs or other jewelry, eye patches, eye glasses, bandages, or the like), to allow a user to selectively enhance or change the visual appearance of the facial features on the layer 101 in other manners.

In yet further embodiments, the layer 101 also may be formed of a transparent or semi-transparent material, so that the user's own facial features are viewable through the mask 100, when the display screen(s) in the layer 112 are off or otherwise not displaying an electronically generated image. In such embodiments, the layer 112 may be controlled to enhances or otherwise change a first visual appearance (corresponding to the appearance features of the user's own face without electronic image enhancements), to a second visual appearance (corresponding to a changed or enhanced visual appearance of the user's face, where one or more electronically generated image is shown in one or more display screen(s) in the layer 112, to change or enhance the appearance of the user's face).

In yet further embodiments, the layer 101 includes transparent or semi-transparent material on portions of the mask 100, and includes opaque (non-transparent) material on other portions of the mask 100, such that portions of the user's face are viewable through the transparent or semi-transparent material of the mask 100, while other portions of the user's face are covered by the opaque (non-transparent) material of the mask. One or more display screen(s) in the layer 112 may be provided over the portions of the mask 100 that are transparent or semi-transparent. Alternatively or in addition, one or more display screen(s) in the layer 112 may be provided over the portions of the mask 100 that are opaque (not transparent). Accordingly, stored images may be selected to enhance or change one or more transparent or semi-transparent portions of the mask (e.g., to enhance or change the visual appearance of the user's own facial features shown through those portions of the mask, and/or further stored images may be selected to enhance or change one or more opaque (non-transparent) portions of the mask 100 (e.g., to enhance or change the visual appearance of the facial features on the layer 101 in those portions of the mask 100).

In some such embodiments, one or more display screen(s) in the layer 112 can be arranged at one or more locations to hide (or add) one or more of a mole, a freckle, or a wrinkle line. It is to be understood that the instant invention does not limit the size of the display to any particular dimensions. Thus, one or more very small display screen(s) can be used. In some embodiments, one or more display screen(s) in the layer 112 includes material that changes color when exposed to light (or to light of a particular wavelength, such as, but not limited to ultra-violet UV). For example, one or more display screen(s) in the layer 112 may include a layer of color changing polymers, photochromatic film or electrochromatic materials of the type used in color changing lenses for sunglasses or the like, to cause the display screen (the whole or one or more selected parts of the display screen) to change color when exposed to light (or a particular wavelength of light). In a further example, a cell (such as, but not limited to, pixel-sized) containing one or more color displaying light reactive material(s) is disposed in the flexible display adjacent to an OLED or other light emitting device that emits light at various wavelengths. A light sensor (e.g., sensor 24 or other sensor disposed in, or associated with, the display screen) detects that the display screen is in bright light. Next, the colors emitted by the OLEDs are adjusted to trigger reactions in the color producing chemical(s) in the aforementioned cell which alone or in concert with the light produced by the OLEDs produce an appropriate visible color resulting from non-absorbed ambient light falling on the display screen. In this way, for example, a flexible display screen disposed over a blemish on a person's skin will continue to hide a skin blemish even in circumstances where the flexible display screen is made of a transparent (or partially transparent material) and ambient light is brighter than that which is displayable by the flexible screen. This system, of course has applications for providing viewable digital displays in bright light that go beyond the mask embodiment.

In particular embodiments, stored image information for one or more display screen(s) in the layer 112 may be selected by a user, through the manual controller 22, to selectively enhance or otherwise change the visual appearance of facial features on the layer 101 of the mask and/or on portions of the user's own face viewable through the mask 100. The manual controller 22 may comprise any suitable manual selection device, such as, but not limited to those described above. In particular embodiments, the manual controller 22 includes or is associated with indicia that identifies a plurality of different selectable image enhancements and/or a plurality of different regions of the face associated with the image enhancements (and/or regions associated with the individual display screens in the display screen layer 112). Thus, different selectable image enhancements may comprise, for example, but not limited to, a plurality of different colors, shades, tones, shapes, contours, styles, combinations thereof, or the like. Different selectable regions of the face may comprise, for example, but not limited to, the regions associated with display screens 112(*a*)-(*i*), or other suitable regions, as discussed above. In particular embodiments, the plurality of different selectable image enhancements and/or the plurality of different regions of the face are arranged in a menu that is displayed to the user, for example, on an electronic display device (not shown) associated with the computer system 32. In further embodiments, instead of or in addition to the manual controller 22, user input may be provided from a further communication device (such as, but not limited to, a smart phone, electronic pad, laptop computer, desktop computer or the like), through a wireless communication link (not shown) with the computer system 32. In such further embodiments, the menu may be displayed on a display device of that further communication device, such that the further communication device operates as a remote controller for the system 10. In still further embodiments, where the flexible display screen system, such as a mask, includes or operates with one or more microphones and a computer system configured with voice recognition ability, the control of the content displayed on one or more flexible display screens (e.g., in the layer 112 of a mask) can be controlled in whole or in part by the wearer's voice commands. In particular embodiments, a mask 100 may include one or more further regions on the front, top, back, sides and side-burn areas of the head, where hair is commonly grown. In such embodiments, one or more further flexible display screens may be included in a corresponding one or more of those further regions of the mask 100, to display images of hair or other head features. In yet further examples of such embodiments, the mask 100 includes hair material (strands of hair or hair-like threads, or the like) overlaying one or more flexible display screens on one or more of those further regions. In such further embodiments, the flexible display screens can provide visual images below the hair material, to enhance the visual effect of the hair material.

Figure 5:
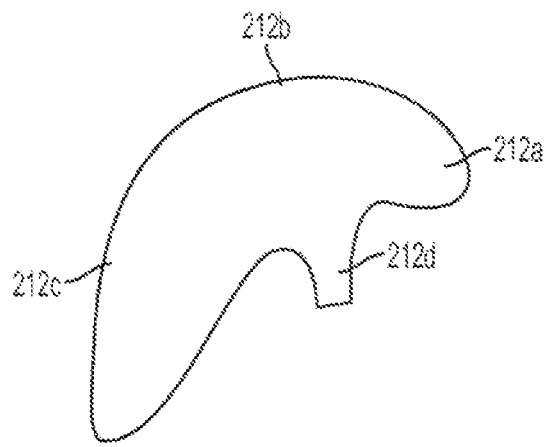
FIG. 5 is a side schematic diagram of the flexible display screen mask of FIG. 4.

In yet other embodiments, the article 14 comprises a wig or head-mask 200 configured to be arranged over the upper, back and/or side-burn regions of the head, but not over the face region of the head, as shown in FIGS. 4 and 5. The mask 200 is shown on a user's head in FIG. 4, and off of the user's head in FIG. 5. The mask 200 is configured similar to the mask 100 described above, and includes one or more flexible display screens 212 (corresponding to the flexible display screen(s) 12 of FIG. 1) in one or more corresponding regions of the mask 200. The one or more corresponding regions in the mask 200 include, but are not limited to, the front region (above the forehead), the top region (facing generally upward when the user is standing), the back region (facing rearward of the user, when the user is standing), the right side region (over and behind the right ear of the user), the left side region (over and behind the left ear of the user), the right side-burn region and the left side-burn region, where flexible display screens 212a-212f, respectively, are located.

In other embodiments, the article 14 comprises another form of a flexible, wearable article (article that can be worn on a person or animal, e.g., on a head, torso, arm, leg, hand, foot, other body part, or combinations thereof). For example, various embodiments of flexible, wearable articles are described herein with reference to FIG. 6. Wearable articles in FIG. 6 include a hat 600, a headband 610, a wrist band 620, a shirt 630, pants 640, a belt 650, and gloves 660. In other embodiments, the wearable article comprises another form or style of the type of article shown in FIG. 6 and/or another type of article such as, but not limited to, a vest, jacket, tie, scarf, tie clip, cufflinks, earring or other jewelry, dress, skirt, cape, hood, poncho, raincoat, cap, hat, helmet, t-shirt, shorts, bikini top and/or bottom, leotard, body suit, earmuffs, gloves, overalls, socks, hose, panty hose, leggings, shoes, slippers, sandals, robe, pajamas, overalls, lingerie, underwear, pasties, socks, panty hose, sunglasses, eye glasses, baseball glove, Christmas stocking, pet clothing, or the like. The types and styles of wearable articles shown in FIG. 6 are provided to assist with the disclosure and explain certain example embodiments, but are not intended to limit other embodiments of the invention to the same types and styles of wearable articles.

In some embodiments the system is configured to display a coded image or a plurality of coded images, that is(are) only visible to a viewer using a device, such as a device comprising or associated with a head's up display (such as Google Glass) or other system that is configured to provide a decoded version of the image or plurality of images, so as to provide to the viewer a view of one or more images on the display that is different from that viewed by another viewer viewing the display with a naked eye unaided by such a head's up display or other system configured to provide a decoded version of the image or plurality of images. In some such embodiments the display is configured to display one or more first images, such as a floral design, to a viewer's naked eye while displaying one or more second images, such as one or more images of one or more concealed body parts, only to the viewer when the viewer uses a viewing device properly configured to display the one or more second images via the viewing device.

Figure 6:
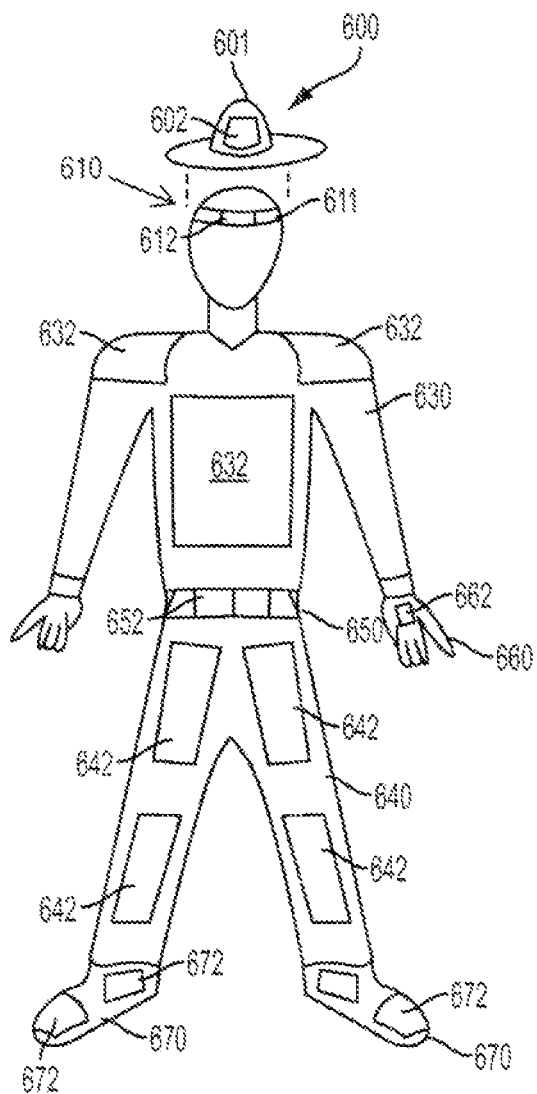
FIG. 6 is a generalized view of various flexible display screen system examples configured as various articles of apparel, according to embodiments of the present invention.

Example embodiments of a wearable article in FIG. 6 include an article that is configured to be worn on a person's head, such as, a hat 600 or a headband 610. The hat 600 comprises at least one layer 601 of a flexible material, such as, but not limited to a cotton, wool, natural, synthetic or composite cloth fabric material of the type typically used for hats, other cloth material, plastic, nylon, silicone, carbon nanotubes, smart fabrics, combinations of the foregoing or the like. The hat also includes one or more flexible display screens 602 (corresponding to the flexible display screen(s) 12 of FIG. 1) that is embedded in or otherwise adhered to, or formed as the flexible material of the layer(s) 601 in any suitable manner, including, but not limited to those discussed above for the flexible display(s) in the one or more regions of the masks 100 or 200. In particular embodiments, at least one flexible display screen 602 is arranged to wrap and curve at least partially around the head of the user, when the hat 600 is worn by the user. In further embodiments, a plurality of flexible display screens 602 are arranged around the circumference of the hat so that the flexible display screens 602 wrap around one or more portions of (or the entire circumference of) the user's head, when the hat 602 is worn by the user.

The headband 610 comprises any suitable flexible material that is formed in a loop having a diameter suitable for snuggly fitting over the forehead of a user. The headband 610 comprises at least one layer 611 of a flexible material, such as, but not limited to a cotton, wool, natural, synthetic or composite cloth fabric material of the type typically used for headbands, other cloth material, plastic, nylon, silicone, carbon nanotubes, smart fabrics, combinations of the foregoing, or the like, preferably having a sufficient elasticity to expand to fit over the user's forehead, and then contract under its own elasticity, to hold comfortably around the user's head. The headband 610 also includes one or more flexible display screens 612 (corresponding to the flexible display screen(s) 12 of FIG. 1) that is embedded in or otherwise adhered to, or formed as the flexible material of the layer(s) 601 in any suitable manner, including, but not limited to those discussed above for the flexible display(s) in the one or more regions of the masks 100 or 200. In particular embodiments, at least one flexible display screen 612 is arranged to wrap and curve at least partially around the forehead of the user, when the headband 610 is worn by the user. In further embodiments, a plurality of flexible display screens 612 are arranged around the circumference of the headband 610 so that the flexible display screens 612 wrap around one or more portions of (or the entire circumference of) the user's head, when the headband 610 is worn by the user.

The wrist band 620 comprises any suitable flexible material that is formed in a loop having a diameter suitable for snuggly fitting over the wrist of a user. The wrist band 620 comprises at least one layer 621 of a flexible material, such as, but not limited to a cotton, wool, natural, synthetic or composite cloth fabric material of the type typically used for wrist bands, other cloth material, plastic, nylon, silicone, carbon nanotubes, smart fabrics, combinations of the foregoing or the like, preferably having a sufficient elasticity to expand to fit over the user's hand, and then contract under its own elasticity, to hold comfortably around the user's wrist. The wrist band 620 also includes one or more flexible display screens 622 (corresponding to the flexible display screen(s) 12 of FIG. 1) that is embedded in or otherwise adhered to, or formed as the flexible material of the layer(s) 621 in any suitable manner, including, but not limited to those discussed above for the flexible display(s) in the one or more regions of the masks 100 or 200. In particular embodiments, at least one flexible display screen 622 is arranged to wrap and curve at least partially around the wrist of the user, when the wrist band 620 is worn by the user. In further embodiments, a plurality of flexible display screens 622 are arranged around the circumference of the wrist band 622 so that the flexible display screens 612 wrap around one or more portions of (or the entire circumference of) the user's wrist, when the wrist band 620 is worn by the user.

The shirt 630 comprises any suitable flexible material that is formed in a shape to wear over the upper torso region of a user. The shirt 630 comprises at least one layer 631 of a flexible material, such as, but not limited to a cotton, wool, natural, synthetic or composite cloth fabric material of the type typically used for shirts, other cloth material, plastic, nylon, silicone, carbon nanotubes, smart fabrics, combinations of the foregoing or the like. The shirt 630 also includes one or more flexible display screens 632 (corresponding to the flexible display screen(s) 12 of FIG. 1) that is embedded in or otherwise adhered to, or formed as the flexible material of the layer(s) 631 in any suitable manner, including, but not limited to those discussed above for the flexible display(s) in the one or more regions of the masks 100 or 200. In particular embodiments, at least one flexible display screen 632 is arranged to wrap and curve at least partially around one or more of the torso region, shoulder region, arms or neck of the user, when the shirt 630 is worn by the user. In further embodiments, a plurality of flexible display screens 632 are arranged to wrap around one or more portions of (or the entire) torso region, shoulder region, arm(s), or neck of the user, when the shirt 630 is worn by the user.

The pants 640 comprise any suitable flexible material that is formed in a shape to wear over the hips and legs of a user. The pants 640 comprise at least one layer 641 of a flexible material, such as, but not limited to a cotton, wool, natural, synthetic or composite cloth fabric material of the type typically used for pants, other cloth material, plastic, nylon, silicone, carbon nanotubes, smart fabrics, combinations of the foregoing or the like. The pants 640 also include one or more flexible display screens 642 (corresponding to the flexible display screen(s) 12 of FIG. 1) that is embedded in or otherwise adhered to, or formed as the flexible material of the layer(s) 641 in any suitable manner, including, but not limited to those discussed above for the flexible display(s) in the one or more regions of the masks 100 or 200. In particular embodiments, at least one flexible display screen 642 is arranged to wrap and curve at least partially around the hips, legs or crotch region of the user, when the pants 640 are worn by the user. In further embodiments, a plurality of flexible display screens 642 are arranged to wrap around one or more portions of (or the entire) hips, legs or crotch region of the user, when the pants 640 are worn by the user.

The belt 650 comprises any suitable flexible material that is formed in a shape to wear around the hips or waist region of a user. The belt 650 comprise at least one layer 651 of a flexible material, such as, but not limited to a cotton, wool, leather, other animal skin, natural, synthetic or composite material of the type typically used for belts, other cloth fabric material, plastic, nylon, silicone, carbon nanotubes, smart fabrics, combinations of the foregoing or the like. The belt 650 also includes one or more flexible display screens 652 (corresponding to the flexible display screen(s) 12 of FIG. 1) that is embedded in or otherwise adhered to, or formed as the flexible material of the layer(s) 651 in any suitable manner, including, but not limited to those discussed above for the flexible display(s) in the one or more regions of the masks 100 or 200. In particular embodiments, at least one flexible display screen 652 is arranged to wrap and curve at least partially around the hips or waist region of the user, when the belt 650 is worn by the user. In further embodiments, a plurality of flexible display screens 652 are arranged around the length (long) dimension of the belt so that the flexible display screens 652 wrap around one or more portions of (or the entire circumference of) the user's hips or waist region, when the belt 650 is worn by the user.

Each glove 660 comprises any suitable flexible material that is formed in a shape to wear on a hand of a user. Each glove 660 comprises at least one layer 661 of a flexible material, such as, but not limited to a cotton, wool, leather, other animal skin, natural, synthetic or composite material of the type typically used for gloves, other cloth fabric material, plastic, nylon, silicone, carbon nanotubes, smart fabrics, combinations of the foregoing, or the like. Each glove 660 also includes one or more flexible displays 662 (corresponding to the flexible display screen(s) 12 of FIG. 1) that is embedded in or otherwise adhered to, or formed as the flexible material of the layer(s) 661 in any suitable manner, including, but not limited to those discussed above for the flexible display(s) in the one or more regions of the masks 100 or 200. In particular embodiments, at least one flexible display screen 662 is arranged to wrap and curve at least partially around one or more of the fingers, thumb, palm or back of the user's hand, when the glove 660 is worn by the user. In further embodiments, a plurality of flexible display screens 662 are arranged to wrap around one or more of the fingers, thumb, palm or back of the user's hand, when the glove 660 is worn by the user.

Each shoe 670 comprises any suitable flexible material that is formed in a shape of a shoe upper or sole, to wear on a foot of a user. Each shoe 670 comprises at least one layer 671 of a flexible material, such as, but not limited to a cotton, wool, leather, other animal skin, natural, synthetic or composite material of the type typically used for shoes, other cloth fabric material, plastic, nylon, silicone, carbon nanotubes, smart fabrics, combinations of the foregoing, or the like. Each shoe 670 also includes one or more flexible displays 672 (corresponding to the flexible display screen(s) 12 of FIG. 1) that is embedded in or otherwise adhered to, or formed as the flexible material of the layer(s) 671 in any suitable manner, including, but not limited to those discussed above for the flexible display(s) in the one or more regions of the masks 100 or 200. In particular embodiments, at least one flexible display screen 672 is arranged to wrap and curve at least partially around a portion of the user's foot, when the shoe 670 is worn by the user. In further embodiments, a plurality of flexible display screens 672 are arranged to wrap around the user's foot, when the shoe 670 is worn by the user.

In yet further embodiments, a flexible display screen system includes two or more wearable articles configured to be worn on two or more different portions of a user, where each wearable article includes one or more flexible display screens as described above. In particular embodiments, the two or more wearable articles may comprise a full or partial body suit that covers the user entirely or partially. In such embodiments, the flexible display screens in the two or more wearable articles may be controlled to display a coordinated image across the entire or part of the user's body, head and extremities.

Figure 7:
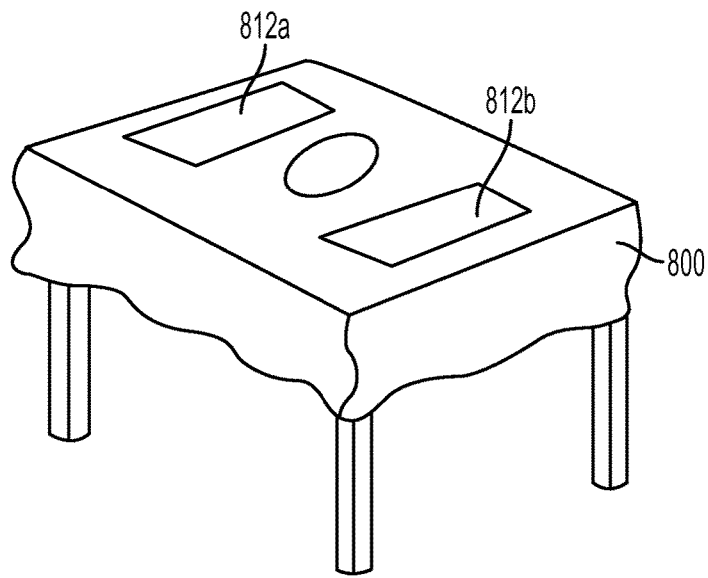
FIG. 7 is a perspective view of a flexible display screen system example configured as a table cloth.

In the above embodiments, the article 14 comprises a mask or apparel item configured to cover a portion of a person's anatomy. In further embodiments, the article 14 comprises a flexible cover for another object or is otherwise deposed on or around another object or part thereof. In particular embodiments, the flexible cover is made of one or more layers of flexible sheet material 11 such as, but not limited to a woven or unwoven cloth (natural or synthetic), cotton, wool, leather or other animal skin, rubber, silicone, latex, nylon, silicone, carbon nanotubes, smart fabrics, combinations of the foregoing, plastic, combinations thereof or other suitable flexible material. In the embodiment of FIG. 7, the cover is configured as a table cloth 800 (or table cover) and is shaped to flexibly fit over and cover at least a portion of a table. One or more flexible display screens 812*a*, 812*b* (corresponding to the flexible display screen(s) 12 of FIG. 1) are provided as a layer on, embedded in or otherwise adhered to the flexible sheet material of the table cloth 800 in any suitable manner, including, but not limited to those discussed above for the flexible display screen(s) in the one or more regions of the masks 100 or 200. In particular embodiments, one or more flexible display screens 812*a*, 812*b* are arranged in a location corresponding to one or more place mats at a table setting, centerpiece or other predefined area(s) of a table when the table cloth 800 is placed over the table. In such embodiments, the flexible displays 812*a*, 812*b* may be controlled to display text or images of menu items, visual images of food, visual designs, advertisements, movies, or other performances, or the like, to one or more persons sitting at (or present near) the table. In yet further embodiments, the article 14 comprises a flexible placemat or napkin, configured to be placed on (and cover) a portion of a table, where the flexible display screen(s) are included in the article in a manner as described above.

In some such embodiments, one or more sensor(s) 24 may comprise a pressure sensor, inductive sensor, temperature sensor or other suitable sensor that provides a signal in response to an item being placed on the table cloth 800, placemat or napkin and/or in response to the temperature of an item placed on the table cloth 800, placemat or napkin (or on a designated location of on the table cloth, placemat or napkin at which sensor 24 is located), where the flexible display screen(s) are controlled to display an image in response to the sensor signal. In yet further embodiments, the one or more sensor(s) 24 provide a signal indicating the amount of pressure, weight, force, temperature, motion or other parameter associated with an item placed on the table cloth 800, placemat or napkin, such that the flexible display screen(s) are controlled to display different images for different sensed levels of the pressure, weight, force, temperature, or other parameter.

In similar embodiments, the cover (including the flexible sheet material of the cover) is configured as a floor covering such as, but not limited to, a rug, carpet, floor mat or the like, or a bed covering such as, but not limited to a blanket, bedspread, duvet, pillow or the like, or a furniture covering such as, but not limited to, the fabric material of or covering for a bed, sofa, chair, pedestal, bench or the like. In such embodiments, one or more sensor(s) 24 may comprise a pressure sensor, inductive sensor or other suitable sensor that provides a signal in response to a person stepping on the floor covering, or laying or sitting on the blanket, bedspread, pillow, bed, sofa, chair, pedestal, bench, etc., where the flexible display screen(s) are controlled to display an image in response to the sensor signal. In yet further embodiments, the one or more sensor(s) 24 provide a signal indicating the amount of pressure, weight, force, speed, motion or other parameter associated with the stepping or laying action, such that the flexible display screen(s) are controlled to display different images for different sensed levels of the pressure, weight, force, speed, or other parameter.

Figure 8:
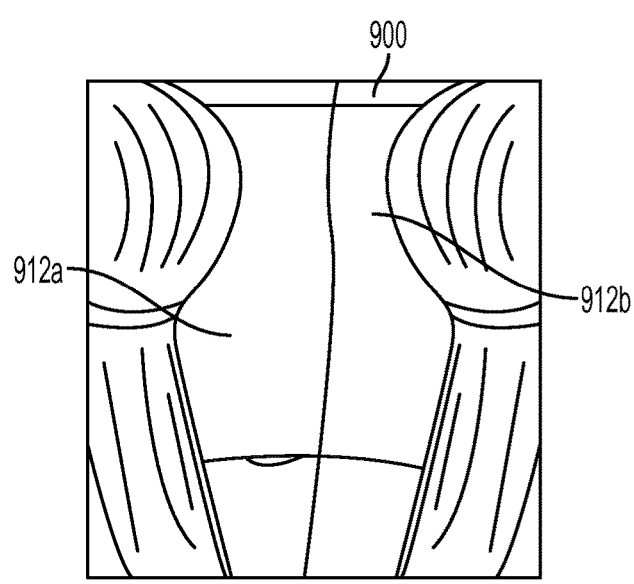
FIGS. 8 and 9 are front views of a flexible display screen system examples configured as window coverings.
Figure 9:
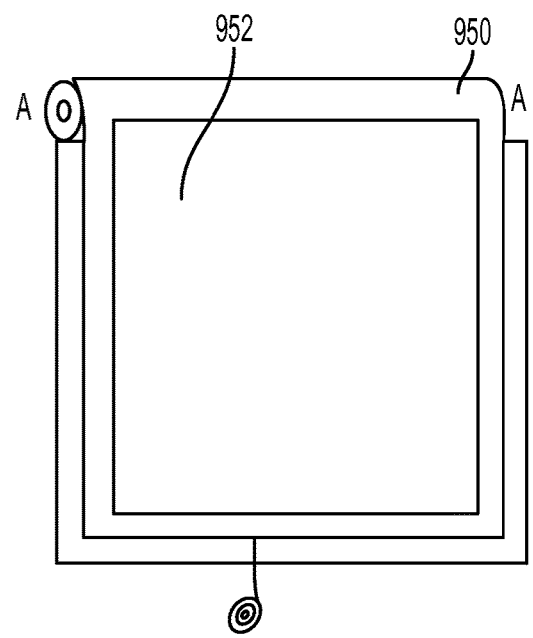
Figure 12:
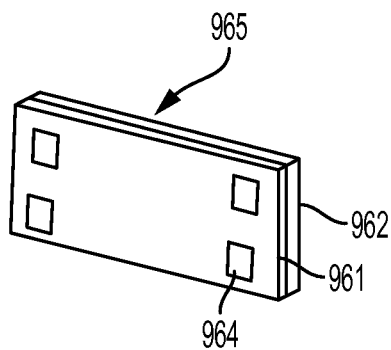
Figure 13:
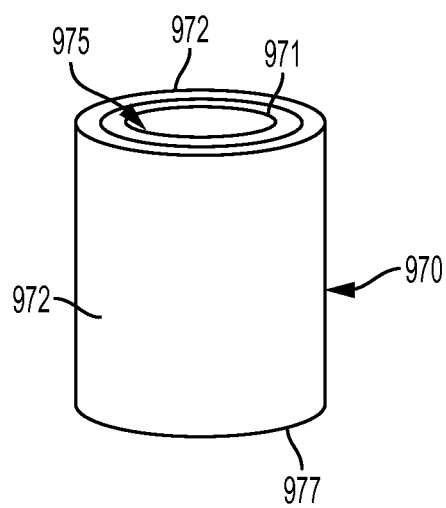
FIG. 13 is a perspective view of a flexible display screen system example configured as a cup, can or bottle cover.

In the embodiments of FIGS. 8 and 9, the cover is configured as a window cover in the form of a curtain 900, shade 950 or other flexible window cover. One or more flexible display screens 912*a*, 912*b* or 952 (corresponding to the flexible display screen(s) 12 of FIG. 1) are embedded or otherwise adhered to the flexible sheet material of the window covers 900 and 950 in any suitable manner, including, but not limited to those discussed above for the flexible display(s) in the one or more regions of the masks 100 or 200. In the embodiment of FIG. 12, the flexible window cover is formed in a curtain configuration that is able to selectively draw from and to one or both sides of a window to selectively cover and uncover at least a portion of the window. In such embodiments, the curtain 900 is configured to be supported in a hanging orientation by a curtain rod or other hardware (not shown). In the embodiment of FIG. 13, the window shade 950, including the flexible display screen 952, is configured to selectively roll up or unroll around a roll axis A, to open or close the shade over the window, in a manner similar to the manner in which conventional window shades roll and unroll. When the curtain of FIG. 8 is closed, or the shade in FIG. 9 is rolled down, the one or more flexible display screens 912*a*, 912*b* or 952 are visible (either from inside of the window or outside of the window, depending upon the direction the flexible display screen faces).

In particular embodiments of a window cover as shown in FIGS. 8 and 9, one or more sensor(s) 24 provide a signal relating to a parameter or condition of a window (or other object) that the window cover is arranged to selectively cover. For example, one or more sensor(s) 24 may be configured to detect a predefined condition such as, but not limited to, the open or closed state of the window, a breakage of glass in the window, and/or weather or other condition outside of the window. In such embodiments, the flexible display screen(s) are controlled to display one or more images in response to the detection (by the sensor(s) 24) of the predefined condition. For example, the flexible display screen(s) may be controlled to display an alarm message (or warning message) in response to the detection of an open condition of the window and/or the breakage of glass in the window.

Figure 10:
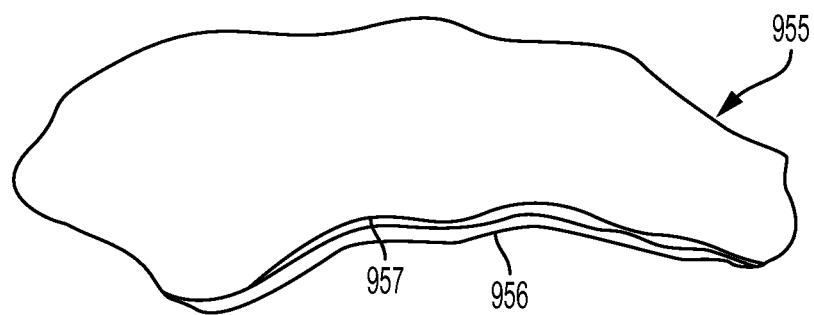
FIGS. 10-12 are perspective views of flexible display screen system examples configured as vehicle covers.

In further embodiments, as shown in FIG. 10, the cover 955 is configured to fit over a vehicle (not shown), such as, but not limited to a car, truck, boat, plane, motorcycle, bicycle, recreational vehicle, or the like. The cover 955 includes one or more layers of a flexible sheet material 956, and one or more flexible display screens 957 (corresponding to the flexible display screen(s) 12 of FIG. 1) are provided as a layer on, embedded in or otherwise adhered to the flexible sheet material 956 of the vehicle cover in any suitable manner, including, but not limited to those discussed above for the flexible display(s) in the one or more regions of the masks 100 or 200. The flexible sheet material 956 may be any suitable material for covering and/or protecting a vehicle from dust, moisture, sun and/or other weather or environmental conditions, such as, but not limited to natural, synthetic, or a combination of natural and synthetic materials, including but not limited to cotton, wool, polyester, nylon, silicone, carbon nanotubes, smart fabrics, combinations of the foregoing, or the like. In particular embodiments, the cover 955 is configured in a shape to conform to the outer shape of a particular type of vehicle.

In particular embodiments, the flexible display screen(s) 957 on the cover 955 may be controlled to display advertisement information, messages or other information that is intended to be viewed by multiple people (where a vehicle on which the cover is placed is parked in a location that is viewable by multiple people). In other embodiments, the flexible display screen(s) 957 on the cover may be controlled to display alarm and/or warning information in response to a sensor 24 detecting an alarm condition, such as, but not limited to, a motion of the vehicle greater than a predefined motion threshold (where the sensor 24 comprises a motion sensor), an opening of a door, hood or window of the vehicle (where the sensor 24 comprises a window, hood or door opening detector), a window shattering (where the sensor 24 comprises an audio sensor for detecting glass breakage), or the like.

Figure 11:
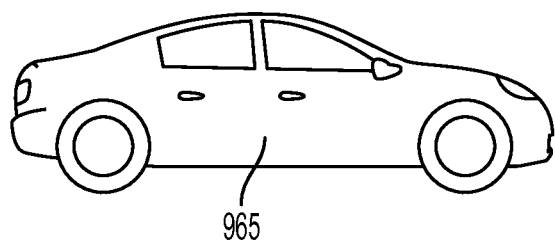

In yet further embodiments as shown in FIGS. 11 and 12, the cover comprises a flexible panel 960 configured to attach to (and cover) at least a portion of the exterior surface of a vehicle or other object.

In some embodiments the remote processor 30 is included in, associated with, or is a part of, one or more other objects, such as clothing, skin, other living tissue, tree trunks or other formerly living tissue, walls, floors, ceilings, doors, windows, mirrors, wall switches, door locks, pipes, street surfaces, runways, light standards, telephone poles, power poles, vehicles (such as cars, trucks, boats and planes), furniture (such as tables), appliances (such as refrigerators, ovens and blenders), beverage and other food containers, ornamental containers, sheets, towels, blankets, puzzle pieces, playing cards, game pieces, toys (such as dolls, stuffed animals, toy construction kit construction pieces, building blocks, including without limitation, interlocking building blocks such as LEGO® pieces, and models), balls (such as soccer balls and golf balls), holiday ornaments, globes, billboards, menus, and books.

In yet further embodiments, the flexible panel 960 comprises an exterior component of a vehicle or other object such as clothing, skin, other living tissue, tree trunks or other formerly living tissue, walls, floors, ceilings, doors, windows, mirrors, wall switches, door locks, pipes, street surfaces, runways, light standards, telephone poles, power poles, vehicles (such as cars, trucks, boats and planes), furniture (such as tables), appliances (such as refrigerators, ovens and blenders), beverage and other food containers, ornamental containers, sheets, towels, blankets, puzzle pieces, playing cards, game pieces, toys (such as dolls, stuffed animals, toy construction kit construction pieces, building blocks, including without limitation, interlocking building blocks such as LEGO® pieces, and models), balls (such as soccer balls and golf balls), holiday ornaments, globes, billboards, menus, and books.

The flexible panel 960 includes a layer of flexible panel material 961 configured to adhere to a vehicle or other object and conform to a curved or bent surface of the vehicle or object, and one or more flexible display screen 962 (corresponding to the flexible display screen(s) 12 of FIG. 1) is provided as a layer on, embedded in or otherwise adhered to, or formed as the flexible panel material. In particular embodiments, the flexible panel material 961 may comprise any suitable material having sufficient strength and durability to support the flexible display screen(s) 962 and flexibility as described herein, including, but not limited to a plastic, rubber, silicone, latex or other suitable material.

One or more securing members 964 are provided on the flexible panel material 961, to adhere one side of the flexible panel material 961 to the exterior surface of a vehicle or other object, where the flexible display screen(s) 962 are arranged to be viewable from the other side of the flexible panel material 961 (i.e., the side facing opposite to the side on which the securing member(s) 964 are provided). The securing members 964 may be any suitable material(s) for connecting the flexible panel 960 to a vehicle or other object, and, in particular embodiments, material(s) that allow the flexible panel 960 to be secured, removed and re-secured (i.e., removeably secured) to a vehicle or other object, including, but not limited to magnet pads (pads of magnet material), adhesive pads (pads of adhesive material) or the like.

In yet further embodiments as shown in FIG. 13, the cover comprises a container cover 970 (for example, but not limited to, a cover for a cup, drinking glass, can, jar, bottle, box, bag, pot, pan, or other food container) configured to receive and surround a portion of a container (such as, but not limited to a generally cylindrical cup, can or bottle). The cover 970 is composed of an inner layer of flexible material 971 that provides thermal insulation, such as, but not limited to Styrofoam, plastic, silicone or the like, where one or more flexible display screens 972 (corresponding to the flexible display screen(s) 12 of FIG. 1) is embedded in or otherwise adhered to or formed as the flexible material. The cover 970 includes an open end 975, opening into an open interior. The open end 975 and open interior are shaped and configured for receiving a cup, can or bottle. In particular embodiments, the cup or bottle cover 970 (e.g., via the layer of flexible material 971 or other closing material) is closed on the end 977 opposite to the open end 975, to enclose the bottom of a cup, can or bottle, when received within the interior of the cover 970. In other embodiments, the end 977 is open, allowing a portion of a cup, can or bottle to extend out from the bottom of the cover 970, when received within the interior of the cover 970.

In some embodiments of the cover 970 for a drinking glass or bottle, the cover 970 includes or is associated with an image sensor or camera (such as sensor 24 or other sensor or camera) and a data storage means (such as memory device(s) 20 or other suitable electronic data memory) and a switch (such as manual operator 22 or other suitable means) to activate the camera to take a picture or video (such as, but not limited to, by touch activation). In such embodiments, the processing system 18 is configured to display the image (picture or video) on one or more display screens on the cover. This would enable a person drinking out of such a container to take a pictures of themselves and generate a photographic display of themselves on the containers so that they and others will be informed as to whom the container belongs.

In particular embodiments, a temperature sensor (as one a sensor 24, discussed above) is provided in the cover 970 (e.g., in the flexible material 971), in a position to sense the temperature of a cup or bottle (or of liquid within the cup or bottle) received within the interior 977 of the cover 970. In such embodiments, the system 10 may be configured to provide different display images on the flexible display screen(s) 975, at different respective temperatures of the cup, bottle or liquid. In that manner, the flexible display screen(s) 975 display images associated with the temperature of the cup, bottle or liquid (e.g., images representing numerical values, designs, icons or other indicia indicating a temperature value). In yet other embodiments, the sensor 24 includes a volume sensor for detecting the volume of liquid within the cup or bottle received within the interior 977. In such embodiments, the system 10 may be configured to provide different display images on the flexible display screen(s) 975, at different respective volumes of liquid in the cup, bottle or liquid. In that manner, the flexible display screen(s) 975 displays images associated with the volume of liquid in the cup, bottle or liquid (e.g., images representing numerical values, designs, icons or other indicia indicating a volume value).

In yet further embodiments, the flexible display screen(s) 12 may be attached to or formed as other flexible articles, such as, a sail of a sailboat, a banner, a flag, windsock, the fabric of a balloon (e.g., a helium, hot-air, or other lighter-than-air balloon), the fabric of an inflatable object such as, but not limited to a ball, floatation device, raft, pool toy, a doll, a game piece, glider, hang glider, fabric wing aircraft, drone air craft, or the like. In certain embodiments described above, a radio-controlled navigation and/or propulsion system may be employed to control for example, the motion of a sailboat, balloon, floatation device, air craft, drone or the like.

In yet further embodiments the flexible display screens 12 display screens may be regular or irregular in shape and be included in, associated with, or is a part of, one or more the exterior surfaces of other types of useful objects, such as clothing, skin, other living tissue, tree trunks or other formerly living tissue, walls, floors, ceilings, doors, windows, mirrors, wall switches, door locks, pipes, street surfaces, runways, light standards, telephone poles, power poles, light bulbs, vehicles (such as cars, trucks, boats and planes), furniture (such as tables), appliances (such as refrigerators, ovens and blenders), beverage and other food containers, ornamental containers, sheets, towels, blankets, puzzle pieces, playing cards, game pieces, toys (such as dolls, stuffed animals, toy construction kit construction pieces, building blocks, including without limitation, interlocking building blocks such as LEGO® pieces, and models), balls (such as soccer balls and golf balls), holiday ornaments, globes, billboards, menus, and books.

As an example of one of the embodiments above, such irregularly-shaped display screens 12 may be disposed on, or incorporated into the surface of irregular objects such jigsaw puzzle pieces. In some such embodiments jigsaw puzzle pieces are configured with, or otherwise include, such irregularly shaped displays, a processor, a wireless communication means and a power source that enable such pieces to receive display information from a computer or other digital device capable of transmitting display data to the jigsaw puzzle piece so configured to display display information transmitted to the jigsaw puzzle piece. Such embodiments of the invention provide a user with the ability to display on jigsaw puzzle pieces so configured different jigsaw puzzle images that correspond to a part of the final solved puzzle image. This provides the user with, in essence, a reprogrammable jigsaw puzzle game. In some embodiments different images for the assembled puzzle (resulting from the different parts of the assembled puzzle images displayed on the displays of different puzzle pieces) may, therefore, be chosen by a user. In some such embodiments, each of such puzzle pieces is wirelessly provided with display information corresponding to a part of the display information that comprises the information required to display the whole puzzle image.

In some embodiments the determination of which portion of the whole puzzle image to transmit to a particular puzzle piece can be the result of programming that assigns a corresponding part of the completed puzzle image information to a puzzle piece based on where such puzzle piece is located in relation to one or more other puzzle pieces in the finished puzzle. In some embodiments each puzzle piece so configured to display puzzle image information has a unique identifier readable by the processor and/or the remote computer or other digital device that transmits display information to the subject puzzle pieces. In some embodiments, the puzzle pieces, configured as contemplated above, are separately addressable such that a puzzle piece is able to receive image display information that corresponds to the puzzle piece's part of the total finished puzzle display. When all such puzzle pieces are assembled into the finished puzzle, the aggregate of all the puzzle piece display in concert the finished puzzle image. In some embodiments, the puzzle pieces can be configured to display different images corresponding to different finished puzzle images. In this way users are provided with a reprogrammable jig saw puzzle.

In still other embodiments the display is incorporated into a game board. In some embodiments the display is incorporated into game pieces. In some instances, such game pieces can be configured to interact with a game board that has an incorporated display. In some embodiments game pieces that include or have disposed on their exterior such displays are configured to interact with augmented reality devices such as heads-up display devices, like Google Glass, to enhance game play.

In some preferred embodiments the display is incorporated into toys, doll clothing or accessories for dolls and other toys.

In some embodiments the displays are incorporated into, or disposed on ball game balls which can produce special display effects. For example such effects may include a baseball configured with a display and pressure sensors that causes the baseball display to light up after the ball has been hit, a basketball configured with such a display that displays a fireball effect after a point has been scored, a golf ball that provides location information can be configured with a display that displays patterns or other information that becomes more and more intense as it nears a hole, a bowling ball configured with an associated display can display a bomb image that appears to blow up pins on which flexible displays are also disposed (with proper sensing, and sensed data signal transmission devices are associated) to display such an effect, similarly billiard balls can be configured with displays, collision sensing devices and collision detection transmission devices to produce animated effects when such balls are struck.

In some embodiments the bodies of musical instruments can be configured to include one or more such displays. In some embodiments information displayed on such displays can be affected by the playing of the instrument.

In some embodiments the bodies of mannequins or robots are configured with one or more such displays. In some embodiments the mannequins or robots are surrogate sex devices with a user can engage in intercourse or other sexual activities while the display of a person is presented on the said display(s) that are integrated onto or into the surface of such mannequin or robot. In some embodiments the images comprise the display of live video of another person.

In some embodiments all or part of the outer surface of a vibrator or dildo is configured with one or more of such displays.

In some embodiments, a condom is configured with one or more such displays.

In some embodiments the entirety, part or substantially all of the bodies of drone devices are configured with one or more such flexible displays conforming to the shape of the drone. In some embodiments such drones configured with one or more flexible displays also are associated with a means for determination of the location of the drone, such as by a GPS receiver, so that the content displayed on the drone is associated with a location or a plurality of locations. In some embodiment of the invention a plurality of drones are configured with such flexible displays and such means of determining the location of the drones, and such drones are each further configured to receive information based on the location of each such drone. In this embodiment a coordinated display involving such configured drones is possible.

In some embodiments all or part of the outside casing or covering of an object configured with one or more such displays can be configured to display one or more images that similar to the environment of the object to achieve an "invisibility" effect. For example, a cuboidal object configured with one or more displays on one side of the object and one or more cameras configured on the opposite face of the object visual information captured by the one or more cameras on one side of the object is displayed on the one or more displays on the opposite face, an effect can be achieved to make the object blend in to the background causing it to appear less visible. In some embodiments one or more cameras are arrayed about the object and information is transmitted in a coordinated manner to displays on the opposite side of the object. In some embodiments analysis of the information received from one or a plurality of cameras is processed before transmission to the one or more displays in another area of the object to enhance the effect when the object is viewed obliquely. In some embodiments the displays are comprised of small pyramidal display units whereby the base of the pyramidal unit is the main display component projecting in the direction away from the object through the three or four remaining sides which are transparent or semi transparent lenses. In some embodiments all of such remaining sides are displays as well and which are partially translucent so as to permit visual information to pass through from the base face which is a display the projects away from the object and out through such partially translucent faces.

In some embodiments, the surfaces of tents, tarps and covers (e.g., car covers, barbecue covers, furniture covers, bicycle covers, instrument covers, pillow cases, etc.) are configured with, or substantially comprise, one or more such flexible displays.

In such embodiments, the motion and/or location of the article may be used by the processing system 18 to control the display of images on one or more flexible display screens on the article. For example, an article in the form of an aircraft may be controlled to fly to a certain height or location, in response to which the processing system 18 controls one or more flexible display screens on the article to display one or more predefined images, such as, but not limited to images of a firework explosion, a UFO, an advertisement or other message, or the like.

In further examples of any of the above-described embodiments or other embodiments of the present invention, the system 10 includes one or more sensors 24 and/or timers 26 connected to provide information to the processor system 18. In such embodiments, the processor system 18 is configured to control the display of information on the flexible display screen(s) 12, based on information provided by one or more sensors 24 and/or timers 26. For example, in particular embodiments, the processor system 18 is configured to respond to one or more sensors 24 and/or timers 26 providing information indicating that a predefined sensing threshold, time period or time has been reached. In such embodiments, the processor system 18 is configured to response to that information by selecting predefined stored image information (e.g., image information associated with the threshold, time period or time) and providing the image information to one or more flexible display screen(s) 12 for display. In this manner, when sensor information indicates that a sensed parameter has reached a predefined threshold, the processor system 18 retrieves image information associated with that threshold and causes the display of an image associated with the retrieved image information on the flexible display screen(s) 12.

In particular embodiments, for any one or more of the sensors 24, the processor system 18 is configured to operate with a plurality N of predefined thresholds and a respective plurality of associated image information, where N is any integer equal to or greater than 1. In such embodiments, when sensor information indicates that a sensed parameter has reached a first predefined threshold, the processor system 18 retrieves first image information associated with the first predefined threshold and causes the display of an image associated with the first image information on the flexible display screen(s) 12. Similarly, when sensor information indicates that a sensed parameter has reached a second predefined threshold, the processor system 18 retrieves second image information associated with the second predefined threshold and causes the display of an image associated with the second image information on the flexible display screen(s) 12. Accordingly, when sensor information indicates that a sensed parameter has reached an Nth predefined threshold, the processor system 18 retrieves Nth image information (image information associated with the Nth predefined threshold) and causes the display of an image associated with the Nth image information on the flexible display screen(s) 12. In particular embodiments, one or more (or each) of the 1-N image information is different from at least one of the other (or each other) of the 1-N image information, such that different images are displayed in response to sensor information indicating one or more (or each) of the different respective thresholds has been reached.

The one or more sensors 24 comprises one or more suitable sensor for sensing a predefined condition, such as, but not limited to, a condition of the environment of or around the flexible display screen(s) 12 (or of the computer system 32 located proximate to the flexible display screen(s) 12), a condition of a user, or the like. The one or more sensors 24 may comprise one or more or any suitable combination of sensors including, but not limited to, temperature sensors (that sense the temperature of the environment around the sensor), atmospheric pressure sensors, location sensors (GPS or other sensors that detect geographic location), light sensors (that sense ambient light), proximity sensors (that sense the proximity, within a predetermined distance, of a person or predefined object), acceleration sensors, other types of motion sensors, electromagnetic field sensors, alarm condition sensors, audio sensors, chemical sensors, door opening sensors, or the like. In particular embodiments, one or more sensors 24 comprise one or more sensors that sense flexible motion or flexing (and/or the degree or amount of flexible motion or flexing) of the flexible display screen(s) 12 and/or flexible material 13. The one or more timers 26 may be any suitable electronic timer, clock and/or time determining software, or the like.

Figure 14:
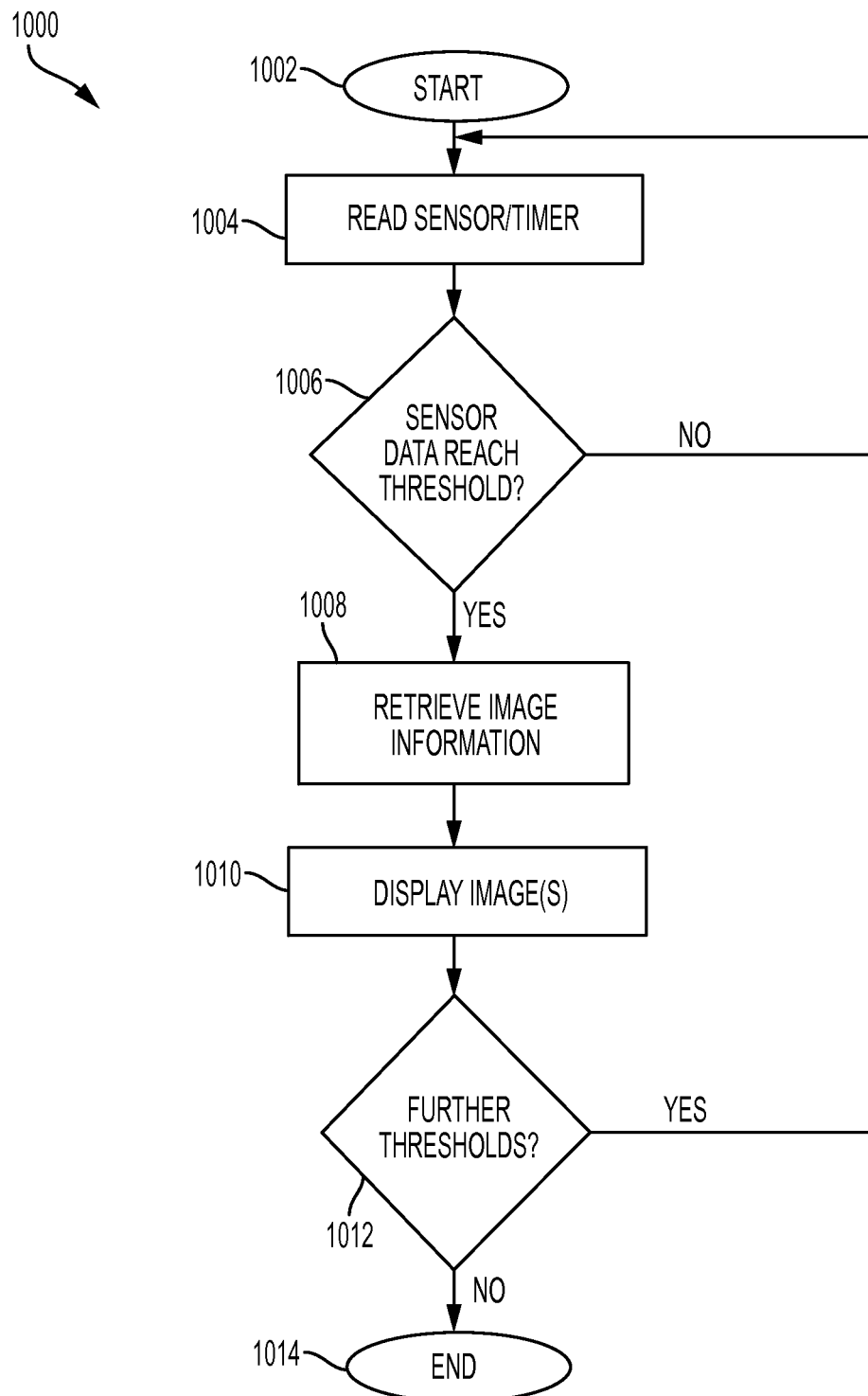
FIG. 14 is a flow chart of a process according to embodiments of the present invention.

An example of a process carried out by the computer system 32 is described with reference to FIG. 14, wherein the processor system is configured to perform operations, as described. In FIG. 14, a process 1000 starts at 1002. Upon (or at a predefined time after) the start of the process 1000, sensor data from one or more sensors 24 is read and/or time data from one or more timers 26 is read, at 1004. A determination is made, at 1006, as to whether or not the sensor and/or time data read at 1004 has reached one or more predefined threshold levels. For example, the processor system 18 may be configured to compare the sensor and/or time data to one or more predefined threshold values.

If the determination made in 1006 is that the sensor and/or timer data has not reached one or more predefined threshold values, then the process returns to 1004, to read further or updated sensor and/or timer data) and, then, to 1006, to determine whether or not the further or updated sensor and/or timer data has reached one or more predefined threshold values. In particular embodiments, the process can continue this loop (through 1004, 1006 and back to 1004), as long as the computer system 32 remains ON and the determination at 1006 is that the sensor and/or timer data has not reached a predefined threshold value. In other embodiments, the process can continue that loop (through 1004, 1006 and back to 1004) as long as the above-noted conditions are met until a predefined time period expires (or other predefined condition has occurred), in which case the process ends.

If the determination made in 1006 is that the sensor and/or timer data has reached one or more predefined threshold values, then display information for controlling the display of a predefined image, video or the like, is retrieved, at 1008. In particular embodiments, the display information retrieved at 1008 corresponds to the one or more threshold values reached by the sensor and/or timer data. For example, a plurality of different image information corresponding (in a one-to-one relationship or other relationship) to a plurality of different threshold values is stored in the memory 20 or otherwise available to the computer system 32 for example, through communication network 28. In such embodiments, at 1008, the processor system 18 is configured to retrieve image information corresponding to one or more threshold values reached by the sensor and/or timer data that is read at 1004. At 1010, the flexible display screen(s) 12 is controlled to display one or more images and/or videos corresponding to the image information retrieved at 1008.

In embodiments involving multiple threshold values, the process 1000 determines whether there are any further thresholds that can be reached, at 1012. In other embodiments involving only one threshold value, then the process 1000 may end after the one or more images and/or videos are displayed at 1010 (or, alternatively, may return to 1004 to read further or updated sensor and/or timer data).

If the determination made at 1012 is that there are further thresholds that could be reached, then the process 1000 returns to 1004 (to read further or updated sensor and/or timer data) and, then, to 1006 to determine whether or not the further or updated sensor and/or timer data has reached one or more of the further thresholds. If, on the other hand, the determination made at 1012 is that there are no further thresholds that could be reached, then the process ends at 1014.

The flow chart in FIG. 14 represents one example embodiment of a process that can be carried out by the system 10. However, other embodiments may employ processes that are variations of the process described herein with respect to FIG. 14 and/or different processes for controlling the display of information on the flexible display screen(s) 12, dependent, at least in part, on sensor and/or timer data.

In any of the above described embodiments, one or more sensors 24 comprise any suitable sensor for sensing a predefined condition, such as, but not limited to, the sensors and conditions described above. In embodiments in which one or more sensors 24 comprises a temperature sensor, then the one or more predefined threshold values comprises one or more predefined temperature levels. In addition, the image information corresponding to the one or more predefined threshold level values comprises image information that is associated with the respective one or more predefined temperature levels. For example, one or more different images displaying temperature information (degrees Fahrenheit and/or Celsius, images associated with a cool or hot temperature or gradient thereof, or the like) may be retrieved and displayed for each different threshold value reached.

In embodiments in which the one or more sensors 24 comprises a pressure sensor, then the one or more predefined threshold values comprises one or more predefined pressure levels. In addition, the image information corresponding to the one or more predefined threshold level values comprises image information that is associated with the respective one or more predefined pressure levels. For example, one or more different images displaying pressure information (bars, or other measures of pressure, or other displayed data responsive to pressure changes, such as color changes, display image frequency, or sound emission changes associated with high or low pressures or gradient thereof, or the like) may be retrieved and displayed for each different threshold value reached.

In embodiments in which the one or more sensors 24 comprises a location sensor, then the one or more predefined threshold values comprises one or more predefined locations. In addition, the image information corresponding to the one or more predefined thresholds comprises image information that is associated with the respective one or more predefined locations. For example, one or more different images displaying location information (addresses, maps, "you are here" information, route to destination information, or the like), images associated with the location, or the like) may be retrieved and displayed for each different location reached.

In embodiments in which the one or more sensors 24 comprises a light sensor, then the one or more predefined threshold values comprises one or more predefined light levels and/or frequencies. In addition, the image information corresponding to the one or more predefined threshold level values comprises image information that is associated with the respective one or more predefined light levels and/or frequencies. For example, one or more different images displaying light information (lumens or other intensity level measures), images associated with high or low light intensity or gradient thereof, frequency or the like) may be retrieved and displayed for each different threshold value reached.

In embodiments in which the one or more sensors 24 comprises a proximity sensor, then the one or more predefined threshold values comprises one or more predefined proximity levels (e.g., distances from the sensor). In addition, the image information corresponding to the one or more predefined threshold level values comprises image information that is associated with the respective one or more predefined proximity levels. For example, one or more different images displaying proximity information (distance measurements or the like), images associated with different distances, and/or messages, warnings or the like, associated with different distances, may be retrieved and displayed for each different threshold value reached.

In embodiments in which the one or more sensors 24 comprises an acceleration sensor, then the one or more predefined threshold values comprises one or more predefined acceleration levels. In addition, the image information corresponding to the one or more predefined threshold level values comprises image information that is associated with the respective one or more predefined acceleration levels. For example, one or more different images displaying acceleration information (rate of acceleration, rate of deceleration, patterns of acceleration/deceleration, etc) images associated with high or low levels of acceleration or gradient thereof, or the like) may be retrieved and displayed for each different threshold value reached.

In embodiments in which the one or more sensors 24 comprises a tactile sensor, one or more tactile sensors may be incorporated into a mask or article of clothing (or other article) as described herein, and the processing system 18 may be configured to provide or change one or more images on the flexible display screen(s) in the mask or article in response to a tactile input from the one or more tactile sensors. Accordingly, games or other activities may be carried out, where a person (or part of the person) who has been touched (or otherwise engaged to activate the tactile sensor on a mask, article of clothing or other article carried by that person) is identified by providing or changing the image displayed on one or more flexible display screens on the mask, article of clothing or other article carried by that person).

For example, in a game of tag, the person who is "it" can be identified by the display of one or more predefined images, and/or a person being "tagged" by a person who is "it" can be identified by the display of one or more predefined images. Similarly, in a game of touch football, the person carrying the ball can be considered tackled, if the tactile sensor associated with that person is activated and the flexible display screen on the mask, article of clothing or other article carried by that person displays or changes to display a predefined image. Similarly, fouls in basketball can be detected by tactile sensors and predefined images can be displayed on a player's clothing or other article associated with the player. In such embodiments, the location of the tactile sensor and the display screen on the mask, article of clothing or other article may be arranged in any suitable locations, but in particular embodiments are arranged to coincide with the location of a tactile input, such that the particular location on the user's face, clothing or other article that was touched (to activate the tactile sensor) is the same location (or near location) to the location at which a display screen displays an image or change in image. Accordingly, the location on the player that the player was touched (tagged, fouled or otherwise touched) is the location at or near where a predefined image is displayed in response to the touching. In particular embodiments, the displayed image may be a predefined message, text, color, or other indicia to represent the location at which the player was touched.

In yet further embodiments, an article employed in a game (e.g., a ball, puck or the like) can include one or more flexible display screens as described herein, where a sensor (e.g., sensor 24, such as, but not limited to a GPS, proximity or other suitable location sensor) detects the location of the game article and one or more flexible display screens on the game article are controlled to display an image associated with the location of the game article. In such embodiments, the processing system 18 may be configured to control the image displayed on the game article so that the image is provided or changed, when the game article moves to an out-of-bounds or foul location, and/or to an end-zone, goal or other scoring location.

In embodiments in which the one or more sensors 24 comprises another type of sensor, then one or more different images displaying information corresponding to that type of sensor may be retrieved and displayed for each different threshold value reached.

According to a further example of any of the above-described embodiments or other embodiments, one or more sensors 24 comprises a sensor that detects flexure, e.g., whether the flexible material (11, 101, 601, 611, 621, 631, 641, 651, 661, 671), and/or the flexible display screen(s) (12, 112, 212, 602, 612, 622, 632, 642, 652, 662, 672) is in a flexed state and an un-flexed state, or detects an amount of flex or bend of the flexible material and/or flexible display screen(s). In such embodiments, the sensors may be any form of sensor capable of detecting flexing (bending) or an amount (magnitude) of flex (or bend) and providing a signal indicative of the amount of flexing and/or indicative of whether (or not) flexing (bending) is detected, whether (or not) flexing (or bending) above a predefined threshold amount is detected or the like. Such sensors may include, but are not limited to, strain sensors, bend sensors, pressure sensors, motion sensors, piezoelectric sensors, electromagnetic field change sensors, temperature sensors, sound sensors, chemical sensors, particle sensors combinations thereof, or the like. In such embodiments, the processor system 18 is configured to respond to sensor signals by selecting predefined stored image information (e.g., image information associated with sensed flexing, amount of flexing, threshold reached, or the like) and providing the image information to one or more flexible display screen(s) 12 for display. Accordingly, the flexible display screen(s) 12 are controlled to display an image (or images), where the displayed image(s) are selected or generated, depending upon (and in response to) a flexing or an amount of flexing of the article 14 on which the flexible display screen(s) 12 is provided.

Thus, for example, one or more flexible display screen(s) on a wearable article (e.g., as described above with respect to FIG. 6 or other wearable article) can be controlled to display one or more different images, depending upon the amount of flexing or bending of the article. Thus, a dancer's leotard, athlete's shirt, runner's shoes, or the like, can be controlled to display different images at different flexing motions of the dancer's or athletes body, or runner's foot and, in particular embodiments, at and along the locations of flexure of the body, foot, etc. Such displays can be designed to provide an aesthetic enhancement to a user's movements. In further embodiments, flexible display screens and displays can be incorporated in tightly fitting wearable articles as described above, and configured to enhance or track such user movements and/or provide visual feedback for evaluating flexing of portions of a person's body during athletic or other motions, for example, to help evaluate or improve athletic performance, to help diagnose or treat physical or medical conditions, or the like. Similarly, in the sail, banner, flag, and wind sock examples described above, a display on one or more display screen(s) can be controlled to display different images at different flexing motions of the sail, banner, flag or wind sock.

In another example, one or more flexible display screen(s) is incorporated in the outer wall of a flexible container (or in a cover or band similar to cover 970 for surrounding a portion of the outer wall of a container) where the container (or cover) also includes one or more sensor(s) that detect flexure as described above. In such embodiments, the sensor(s) is configured to detect a predefined amount of expansion (or contraction) of the container, and the processing system 18 is configured to control the one or more flexible display screen(s) to provide or change a predefined image in response to the detection of the predefined amount of expansion (or contraction). In particular embodiments, a plurality of different predefined images are displayed for a plurality of different predefined threshold levels of expansion (or contraction), respectively, such that a different one of the predefined image is displayed in response to the detection of expansion (or contraction) at each respective different one of the predefined threshold levels. In particular embodiments, such a flexible display screen system can be configured as a food container (or as a cover to fit over a food container), to detect a predefined amount of expansion of the food container that would occur over time, due to bloating of or bacterial growth in the food container.

For example, in some embodiments information from the aforementioned strain sensors, bend sensors, pressure sensors, motion sensors, piezoelectric sensors, electromagnetic field change sensors, temperature sensors, sound sensors, combinations thereof, or the like, can be associated with pre-determined values that indicate a threshold condition triggering a warning or alarm that can be displayed on one or more configured displays. Such as system in association with a can or other container containing food or other consumable material about which the aforementioned display configured in association with could be used to warn consumers via display of a warning on one or more of such configured displays that bacteria in the material in the container, which has produced gases due to reproduction, have reached a dangerous level. Such display of information might read "DO NOT CONSUME" or a similar warning. In some embodiments the information from the aforementioned sensors is transmitted wirelessly (via Bluetooth or other means) to a remote computer or similar device. In some embodiments feedback information or information for display on one or more of the displays associated with the contain is transmitted wireless (via Bluetooth or other means) to one or more of the display units.

In yet other embodiments, the flexible article 14 is provided with one or more electronic, mechanical or electromechanical motive devices (such as, but not limited to motors, actuators, solenoids, or the like) or manual movement devices and suitable linkage to apply a force on the flexible article 14 sufficient to cause the article to flex (bend) in a controlled manner. In such embodiments, one or more electronic processor systems (such as, but not limited to the processor system 18) may be connected to the motive device to electronically control the amount of force (and the amount of flex or bending action) applied to the flexible article 14, to electronically control the amount of flexing or bending of the article 14. Also in such embodiments, one or more sensors 24 may be connected to provide a sensor signal to the processor system(s), based on sensed parameter, where the processor system(s) are configured to cause and control an amount of force (flexing or bending) applied to the article in response to and dependent on the sensor signal. In such embodiments, the flexible article 14 (including the flexible display screen(s) 12 are controlled to flex (bend), based on and dependent upon the sensor signal.

For example, in such embodiments, the sensor(s) 24 may include one or more of a motion, proximity, light, temperature or other suitable sensor, for sensing the location of a person or object in the vicinity of the sensor. In such embodiments, the flexible article 14 and flexible display screen(s) 12 may be controlled, for example, to flex or bend into a state (bending state) that is better for viewing images from the location of the person or object sensed by the sensor 24. Alternatively, the flexible article 14 and flexible display screen(s) 12 may be controlled to flex or bend into a state that inhibits viewing of images from the location of the person or object sensed by the sensor 24. In yet other embodiments, the flexible article 14 and flexible display screen(s) 12 may be controlled to flex or bend into a state that provides a view of a different image (e.g., different display screen(s) 12 or a different portion of the display screen(s) 12) to a person located at the location of the sensed person or object, relative to the image (display screen(s) 12 or portion of the display screen(s) 12) viewable to a person located at another location.

In yet further embodiments, the processor system is configured to control the flexing (bending) of the flexible article 14 and flexible display screen(s) 12, depending upon and based upon image information being displayed on the flexible display screen(s) 12. Thus, for example, when the image displayed on the flexible display screen(s) 12 is of a round or spherical object, then the processor system controls the flexing or bending of the flexible article 14 and flexible display screen(s) 12 to form a rounded or partial sphere shape. However, when the image displayed on the flexible display screen(s) 12 is of a flat object or expansive view, then the processor system controls the flexing or bending of the flexible article 14 and flexible display screen(s) 12 to be relatively flat.

Yet further embodiments of the present invention incorporate various combinations of embodiments described herein. For example, embodiments of a flexible display screen system may include one or more sensors for detecting flexure or bending of an article 14 (or of one or more flexible display screens 12), one or more mechanisms for controlling flexure or bending of the article 14, one or more flexible display screens 12 controlled (via a processing system 18) to display images associated with the detected amount of flexure and or the controlled amount of flexure. In one example embodiment, such an article may be formed as a wearable article such as, but not limited to a wearable body suit for electronic gaming with haptic and visual display features. Such a wearable article may include haptic and/or electronic shock delivery mechanisms arranged to deliver the person wearing the suit a force (mechanical and/or electronic), for example, as part of a game. Such an effect can provide the effect of receiving a blow in a fight or other game activity. Such a wearable article may include one or more mechanical devices for constricting one or more portions of the wearable article, for example, to provide a squeezing effect as part of a game activity. In particular embodiments, one or more flexible display screens on the wearable article is controlled to display an image associated with the haptic, electronic or constricting force. For example, an image of a wound or a gripping hand or other image associated with the force delivered by the wearable article is displayed on the flexible display screen(s), for example, at or near the location where the force was delivered to the person wearing the wearable article. Also in such embodiments, the wearable article may include one or more sensors (such as sensors 24) configured to detect flexure (such as the amount and/or location of flexure) and signals representing the detected flexure as game input to control one or more electronic game activities.

In each of the embodiments described above, the computer system 32 may be adhered to the article 14, for example, glued, embedded, sewn or otherwise connected on or in the article 14, for example, in a location that is normally concealed from view when the article 14 is used. Alternatively, the computer system 32 may be provided in a separate housing or other structure, to be carried with or placed near the user or object on which the article 14 is placed. In particular embodiments, the computer system 32 is provided within a housing having a configuration, size and shape to be placed in a standard sized clothing pocket or otherwise carried by a user of mask or other apparel item such as described above with respect to FIGS. 2-10.

In embodiments described above, image information for the one or more flexible display screen(s) may be information for displaying a still image, multiple still images (e.g., in a predefined order or in pseudorandom order), video images or combinations thereof. In embodiments described above, image information for the one or more flexible display screen(s) 12 is stored in one or more electronic memory devices 20 or obtained over the network 28, from a remote processor 30. In other embodiments, image information for the one or more flexible display screen(s) 12 is provided by other sources electronically connected to the computer system 32. In yet other embodiments, image information for the one or more flexible display screen(s) 12 may be generated dynamically (not from a pre-stored image) by the processor system 18 configured to generate display information (e.g., randomly, pseudo-randomly, in a predefined changing pattern, in response to information provided by one or more sensors 24 and/or timers 26, in response to user input from the manual controller 22 or other manual input device, or the like).

In yet other embodiments, image information for the one or more flexible display screen(s) 12 may be generated dynamically in response to user input from a further computer device (such as, but not limited to, smart phone, smart pad, laptop computer, desktop computer, a wearable computer, an implanted computer, a computer associated with a useful object, or the like) connected for communication with the computer system 32 (e.g., through a suitable wired or wireless link, as described above). With such embodiments, the further computer device is configured (for example, with suitable software, firmware, hardware or combinations thereof) to allow a user to select, draw, create, color, shade, tone, and/or provide other visual enhancements to an image of a face on a display screen associated with that further computer device. With such embodiments, a user may create an image of a face and facial features on the display device associated with the further computer device and, then communicate corresponding image information to the computer system 32, for display on the flexible display screen(s) in the display screen layer 112 of the mask in FIGS. 2 and 3 or for display on the flexible display screen(s) 212 on the wig or head mask 200. Similarly, with such embodiments, a user may use the further computer device to select, draw, create, color, shade, tone and/or provide other visual enhancements to an image on display screen(s) 12.

In further embodiments of the present invention, one or more flexible display screen(s) 12 may be attached to, included in or otherwise associated with one or more articles 14 as described above and, or other articles 14.

For example, one or more flexible display screen(s) 12 (or display screen layer 112) may be layered onto a curved (or flat) surface of, or otherwise included on or in a surface of, a transparent or partially transparent object (window, lens, glasses, goggles or other eyewear that is wearable over a person's eyes). In particular embodiments, the transparent or partially transparent object is a transparent or partially transparent electronic display screen device, where objects or scenes on the other side of the display screen device (relative to the person viewing the display screen(s)) are viewable at the same time that images displayed on the display screen(s) are viewable. Accordingly, images may be displayed on the display screen(s) in a manner in which they appear to be superimposed on or with objects or scenes viewable through the display screen device. In particular embodiments, such transparent or partially transparent visual display screen devices may include, but are not limited to electronic heads-up display devices (such as, but not limited to displays in vehicle windshields, windows in buildings or other structures, billboards, glasses, goggles or other eyewear wearable over a person's eyes (including such as, but not limited to Google Glass), or the like.

In some embodiments of the invention an adhesive is disposed on part of one or more flexible display screen(s) 12 (or display screen layer (112) or a housing associated with flexible display screen(s) 12 (or display screen layer (112). In some embodiments the adhesive provides adhesiveness similar to that used in a Post-It® (3M Company). In some further embodiments thin flexible display products produced according to the invention that include such an adhesive components can be configured to provide a user with the ability to generate notes and other information records and display such notes and other records via a flexible display product, and to then temporarily affix such display containing the note or other record to surfaces in a similar fashion as is commonly done with respect to the notes written on a Post-It®. In some further embodiments, the note or other information is retrieved and displayed on the display in response to activation of by touch activation where the display is a touch screen display, voice command, or similar means.

In some embodiments of the invention one or more flexible displays are affixed to or comprise a credit card, debit card or gift card. In some embodiments of the invention the flexible display is a touch screen and the flexible display contains or is associated with one or more processors and wireless transceivers that is/are in communication with a remote computer that provides the means for a user to determine information about the account associated with the credit card, debit card, gift card, etc., such as balance, transaction history, etc., by touch controls displayed on the flexible display.

In some embodiments of the invention flexible display screen 12 (or display screen layer (112) or a housing associated with flexible display screen 12 or display screen layer (112)) is configured to adapt to a human eye in a manner similar to a contact lens. In some embodiments, such a housing associated with flexible display screen 12 or display screen layer (112) is also associated with a processor, a transceiver for communication with a remote computer or other digital device, and a power source, all of which are configured to be disposed over an eye to form an "over-eye display device." In some embodiments, the "over-eye display device" includes a display screen 12 or display screen layer 112 disposed on the eye facing part of the over-eye display device. In some configurations the over-eye display device is configured with a second display disposed on the part of the over-eye display device that faces away from the eye. This second flexible screen provides a user with the ability to display different color eyes, etc.

In some embodiments, the flexible display screens 12 comprise a part of "lighting source device" whereby flexible display screen 12 (or display screen layer (112) or a housing associated with flexible display screen 12 or display screen layer (112)) is configured to have the general shape of the light diffusing portion of a common incandescent, fluorescent or LED light bulb. In some embodiments, the aforementioned lighting source device also includes in association with such flexible display screen 12 (or display screen layer (112) or a housing associated with flexible display screen 12 or display screen layer (112), a processor, a transceiver for communication with a remote computer or other digital device, and a power source. In some embodiments, the lighting source device is configured with external power conducting terminals or other connection, such as the type typically found at the bottom of a common incandescent light bulb, to screw into or otherwise mate with a light socket. In some configurations the coupling of an external power source for the lighting source device is achieved by screwing a light source device shaped light a standard incandescent light bulb into a live standard incandescent light bulb socket. Similar coupling can be achieved for other configurations of the lighting source devices (e.g., connecting a lighting source device shaped light a fluorescent light bulb can be configured with power connectors that enable such a shaped lighting source device to connect to a power socket appropriate for a fluorescent light bulb.

The embodiments disclosed herein are to be considered in all respects as illustrative and not restrictive of the invention. The scope of the invention is indicated by the appended claims, rather than the foregoing description. All changes that come within the meaning and range of equivalency of the claims are therefore intended to be embraced therein.

The invention claimed is:

1. A flexible display screen system comprising:
an article comprising a flexible material;
at least one flexible display screen secured on the flexible material;
at least one motive device and linkage to apply a force on the flexible material or on the at least one flexible display screen to cause the flexible material or the at least one flexible display screen to flix or bend in a controlled manner;
a computer system configured to provide image information for controlling a display of images on the flexible display screen; and
at least one sensor coupled to the computer system and configured for sensing a plurality of different levels of pressure, and providing different sensor information corresponding to each different level of pressure sensed by the at least one sensor;
wherein the computer system is further configured to determine when the sensed level of pressure reaches each of a plurality of different predefined thresholds and to control the at least one motive device to provide a different amount of flexing or bending of the flexible material or of the at least one flexible display screen, dependent on the threshold reached by the sensed level of pressure to which the sensor information corresponds.

2. The system of claim 1, wherein the computer system is configured to provide image information for providing a plurality of different images respectively corresponding to the plurality of different thresholds of the sensed level of pressure.

3. The system of claim 1, wherein the computer system comprises one or more processor systems connected to the motive device to electronically control an amount of flex or bend of the flexible material.

4. The system of claim 1 wherein the force applied by the at least one motive device and linkage causes the at least one flexible screen to flex or bend with the material.

5. The system of claim 1, wherein the article comprises a wearable article.

6. The system of claim 1, wherein the computer system comprises one or more processor systems configured to control the images displayed on the flexible display screen to display one or more different images depending on each sensed level of pressure to which the sensor information corresponds.

7. The system of claim 1, wherein the computer system comprises one or more processor systems configured to control the images displayed on the flexible display screen dependent upon the amount of flex or bend of the flexible material by the at least one motive device.

8. The system of claim 1, wherein the at least one motive device comprises at least one motor, actuator or solenoid.

9. The system of claim 1, wherein the one or more processor systems are configured to electronically control the at least one motive device to provide a different amount of flexing or bending of the flexible material or of the at least one flexible display screen dependent upon each of at least three different thresholds of the sensed level of pressure to which the sensor information corresponds.

10. A flexible display screen system comprising:
an article comprising a flexible material;
at least one flexible display screen secured on the flexible material;
at least one motive device and linkage to apply a force on the flexible material or on the at least one flexible display screen to cause the flexible material or the at least one flexible display screen to flex or bend in a controlled manner;

a computer system configured to provide image information for controlling a display of images on the flexible display screen; and at least one sensor coupled to the computer system and configured for sensing a plurality of different levels of a predefined condition, and providing different sensor information corresponding to each different level of the predefined condition sensed by the at least one sensor;

wherein the computer system is further configured to control the at least one motive device to provide a different amount of flexing or bending of the flexible material or of the at least one flexible display screen, dependent on each different sensed level to which the sensor information corresponds; and wherein the predefined condition which the at least one sensor is configured for sensing comprises temperature.

11. A flexible display screen system comprising:

an article comprising a flexible material;

at least one flexible display screen secured on the flexible material;

at least one motive device and linkage to apply a force on the flexible material or on the at least one flexible display screen to cause the flexible material or the at least one flexible display screen to flex or bend in a controlled manner;

a computer system configured to provide image information for controlling a display of images on the flexible display screen; and at least one sensor configured for sensing a plurality of different distances from the at least one sensor for providing different sensor information corresponding to each different distance sensed, wherein the computer system comprises one or more processor systems connected to the at least one motive device to electronically control the at least one motive device to provide a different amount of flexing or bending of the flexible material or of the at least one flexible display screen dependent upon each of at least three different thresholds of distances to which the sensor information corresponds.

12. The system of claim 11, wherein each of the distances corresponds to a location of a person or of an object in the vicinity of the sensor, and wherein the one or more processor systems control the motive device to flex or bend the flexible material or the at least one flexible display screen to a bending state that is better for viewing images on the at least one flexible display screen at the location of the person or of the object that corresponds to the at least one of the distances.

13. The system of claim 11, wherein each of the distances corresponds to a location of a person or of an object in the vicinity of the sensor, and wherein the one or more processor systems control the motive device to flex or bend the flexible material or the at least one flexible display screen to a bending state that at least partially inhibits viewing images on the at least one flexible display screen at the location of the person or of the object that corresponds to at least one of the distances.

14. The system of claim 11, wherein each of the distances corresponds to a location of a person or of an object in the vicinity of the sensor, and wherein the one or more processor systems control the motive device to flex or bend the flexible material or the at least one flexible display screen to a state that provides a view of a first image on a first portion of the at least one flexible display screen at the sensed location of the person or of the object, and that also provides a view of a second image on a second portion of the at least one flexible display screen at a different location relative to the sensed location of another person or of the object.

15. The system of claim 11, wherein the images displayed on the flexible display screen correspond with an amount of flex or bend of the flexible material or the at least one flexible display screen by the at least one motive device and linkage.

16. A flexible display screen system comprising:

an article comprising a flexible material;

at least one flexible display screen secured on the flexible material;

at least one motive device and linkage to apply a force on the flexible material to cause the flexible material to flex or bend in a controlled manner; and a computer system configured to provide image information for controlling a display of images on the flexible display screen, wherein the images displayed on the flexible display screen correspond with an amount of flex or bend of the flexible material by the at least one motive device and linkage;

wherein the computer system comprises one or more processor systems configured to control the at least one motive device to flex or bend the flexible material dependent upon the images displayed on the flexible display screen; and wherein the one or more processor systems are configured to control the at least one motive device to flex or bend the flexible material in a rounded or partially spherical shape upon the images on the flexible display screen displaying a round or spherical object.

* * * * *